US011067821B2

(12) United States Patent
Andreev et al.

(10) Patent No.: US 11,067,821 B2
(45) Date of Patent: *Jul. 20, 2021

(54) APODIZED OPTICAL ELEMENTS FOR OPTICAL ARTIFACT REDUCTION

(71) Applicant: Facebook Technologies, LLC, Menlo Park, CA (US)

(72) Inventors: Gregory Olegovic Andreev, Kirkland, WA (US); Gang Li, Bothell, WA (US); Erik Shipton, Kenmore, WA (US); Yingfei Jiang, Redmond, WA (US); Wanli Chi, Sammamish, WA (US); Andrew John Ouderkirk, Kirkland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/505,412

(22) Filed: Jul. 8, 2019

(65) Prior Publication Data
US 2021/0011303 A1 Jan. 14, 2021

(51) Int. Cl.
| | |
|---|---|
| *G02B 27/58* | (2006.01) |
| *G06F 3/01* | (2006.01) |
| *G02B 27/09* | (2006.01) |
| *G02B 27/01* | (2006.01) |

(52) U.S. Cl.
CPC ......... *G02B 27/58* (2013.01); *G02B 27/0172* (2013.01); *G02B 27/0977* (2013.01); *G06F 3/013* (2013.01); *G02B 2027/014* (2013.01); *G02B 2027/0174* (2013.01)

(58) Field of Classification Search
CPC ............... G02B 27/58; G02B 27/0172; G02B 27/0977; G02B 2027/014; G02B 2027/0174; G03F 3/013
See application file for complete search history.

(56) References Cited

U.S. PATENT DOCUMENTS

| | | | |
|---|---|---|---|
| 4,687,720 A | 8/1987 | Wreede et al. | |
| 8,257,885 B1 | 9/2012 | Efimov | |
| 9,442,291 B1 * | 9/2016 | Martinez | ............ G02B 27/0172 |
| 9,513,480 B2 * | 12/2016 | Saarikko | .............. G02B 5/1861 |

(Continued)

FOREIGN PATENT DOCUMENTS

WO 2021/007134 1/2021

OTHER PUBLICATIONS

Brotherton-Ratcliffe, et al., Diffraction in Volume Reflection Gratings With Variable Fringe Contrast, Applied Optics, vol. 54, No. 16, pp. 5057-5064, Jun. 1, 2015.

(Continued)

*Primary Examiner* — Ricardo Osorio
(74) *Attorney, Agent, or Firm* — Weaver Austin Villeneuve & Sampson LLP

(57) ABSTRACT

Techniques disclosed herein relate to a near-eye display system. One example of an optical device of a near-eye display includes a substrate and holographic grating conformally coupled to a surface of the substrate. The substrate is transparent to visible light and infrared light and is configured to be placed in front of an eye of a user of the near-eye display. A refractive index modulation of the holographic grating is apodized in a surface-normal direction of the substrate to reduce optical artifacts in the visible light.

19 Claims, 21 Drawing Sheets

(56) References Cited

U.S. PATENT DOCUMENTS

| | | | |
|---|---|---|---|
| 2014/0126029 A1 | 5/2014 | Fuetterer | |
| 2015/0185475 A1* | 7/2015 | Saarikko | G02B 6/34 |
| | | | 382/117 |
| 2016/0085300 A1* | 3/2016 | Robbins | G02B 27/0093 |
| | | | 345/633 |
| 2017/0003505 A1* | 1/2017 | Vallius | G02B 27/4205 |
| 2017/0102540 A1 | 4/2017 | McGlew et al. | |
| 2017/0235219 A1* | 8/2017 | Kostamo | B29D 11/00951 |
| | | | 264/40.1 |
| 2018/0188689 A1 | 7/2018 | Ziegler et al. | |
| 2018/0284884 A1* | 10/2018 | Sulai | G02F 1/011 |
| 2019/0094536 A1 | 3/2019 | TeKolste et al. | |
| 2020/0159030 A1* | 5/2020 | Ayres | G02B 27/283 |
| 2020/0192282 A1* | 6/2020 | Kim | G03H 1/28 |
| 2020/0225482 A1* | 7/2020 | Bodiya | G02B 27/0172 |
| 2020/0233128 A1* | 7/2020 | Bouchier | G03H 1/26 |
| 2021/0011284 A1* | 1/2021 | Andreev | G02B 27/0179 |

OTHER PUBLICATIONS

Liu, et al., Asymmetry in the Diffraction Spectrum of a Reflection Hologram Grating, Journal of Modern Optics, vol. 42, No. 3, pp. 639-653, Mar. 1995.
PCT Application No. PCT/US2020/040839, "International Search Report and Written Opinion", dated Nov. 30, 2020, 13 pages.

* cited by examiner

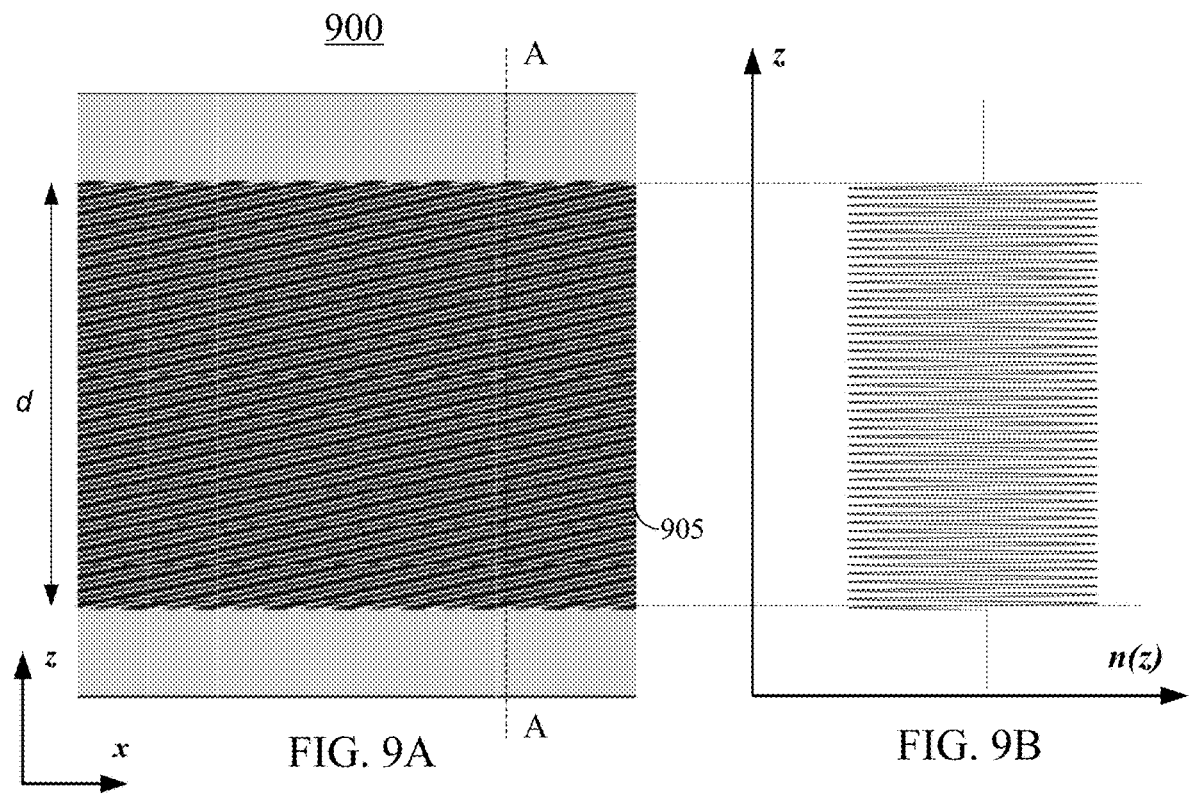
FIG. 9A
FIG. 9B
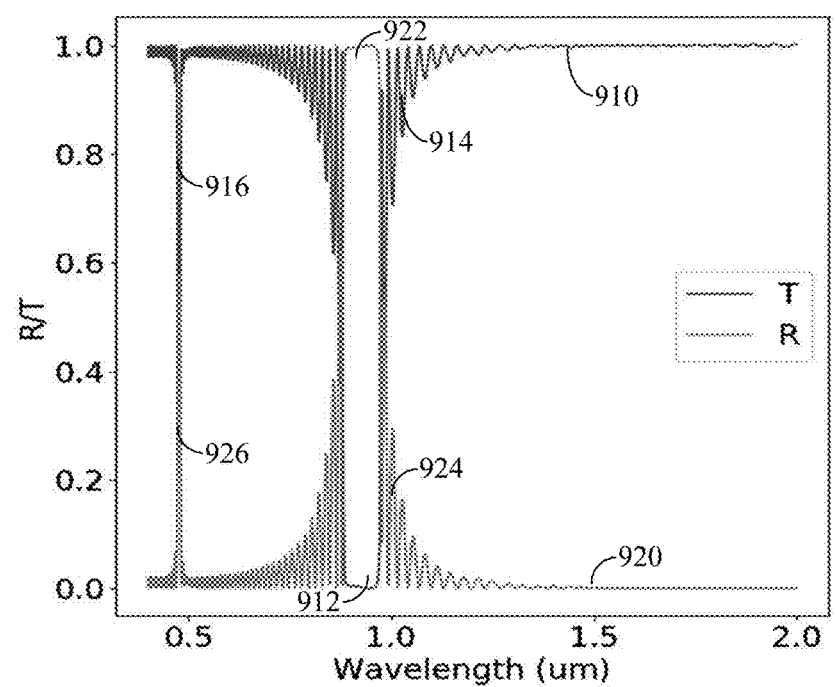
FIG. 9C

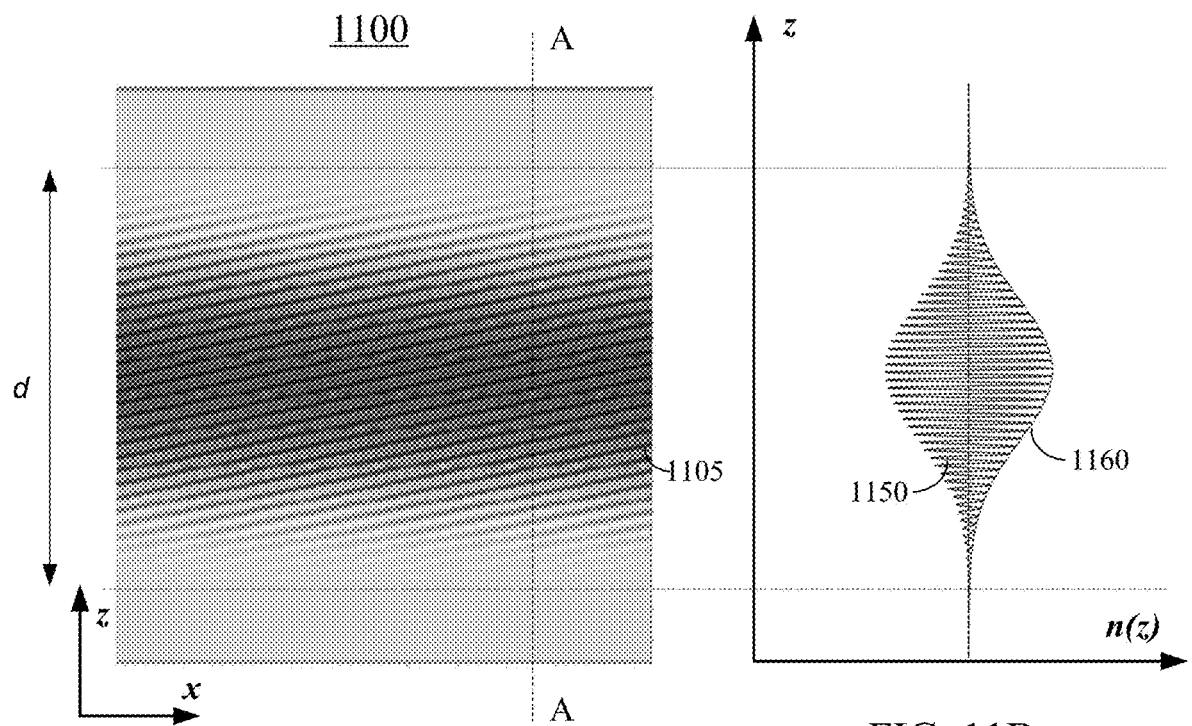
FIG. 11A
FIG. 11B
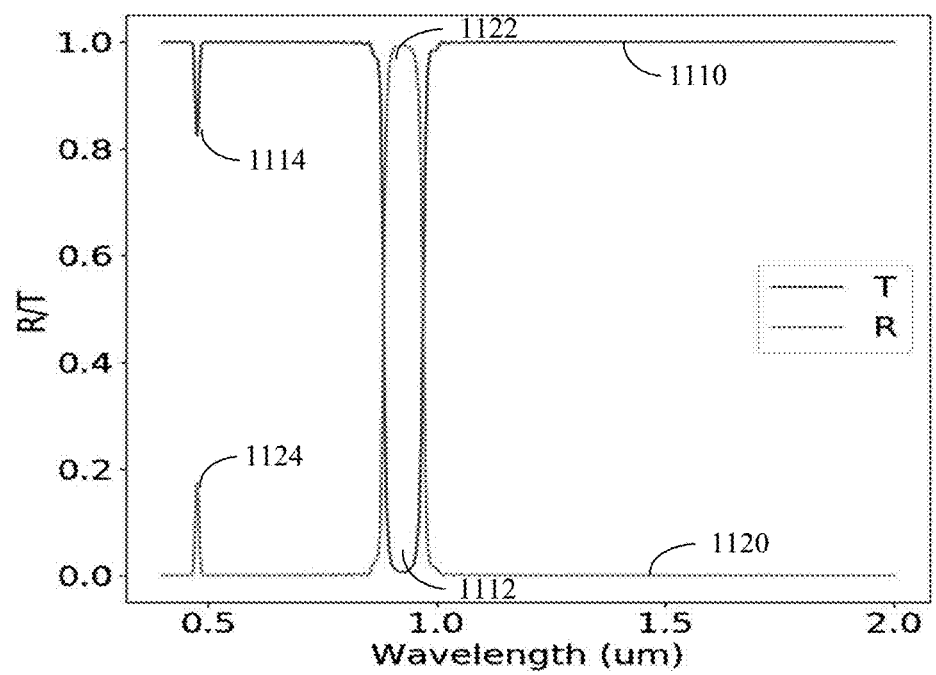
FIG. 11C

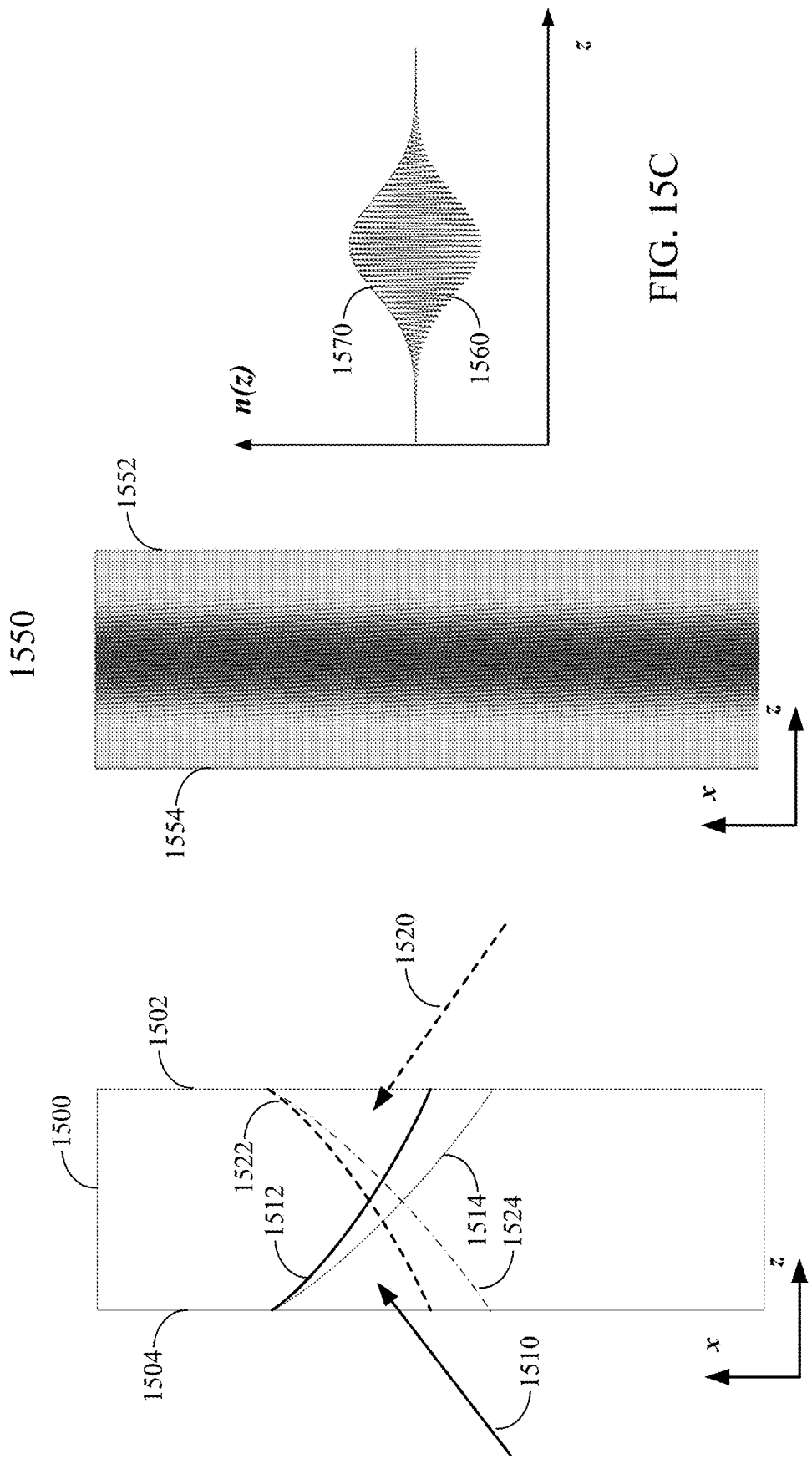

APODIZED OPTICAL ELEMENTS FOR OPTICAL ARTIFACT REDUCTION

CROSS-REFERENCE TO RELATED APPLICATIONS

This regular U.S. patent application is being filed concurrently with U.S. patent application Ser. No. 16/505,462, filed on Jul. 8, 2019, and entitled "APODIZED REFLECTIVE OPTICAL ELEMENTS FOR EYE-TRACKING AND OPTICAL ARTIFACT REDUCTION", the entire content of which is incorporated by reference into this application for all purposes.

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

To provide a more immersive artificial reality experience, some artificial reality systems may include an input device for receiving user inputs, such as hand and/or finger movements. Additionally or alternatively, artificial reality systems can employ eye-tracking systems that can track the user's eye (e.g., gaze direction). The artificial reality systems may then employ the gaze direction information and/or information gained from the input device to modify or generate content based on the direction in which the user is looking, thereby providing a more immersive experience for the user. Eye-tracking systems can also be used for foveated rendering, foveated compression and transmission of image data, alertness monitoring, etc.

SUMMARY

This disclosure relates generally to near-eye display systems. According to certain embodiments, an eye-tracking system includes a substrate transparent to visible light and infrared light, and a reflective holographic grating conformally coupled to a surface of the substrate. The reflective holographic grating is configured to transmit the visible light and reflectively diffract infrared light in a first wavelength range for eye tracking. A refractive index modulation of the reflective holographic grating is apodized in a direction along a thickness direction of the reflective holographic grating to reduce optical artifacts in the visible light.

In some embodiments of the eye-tracking system, a magnitude of the refractive index modulation of the reflective holographic grating may be characterized by a bell-shaped curve in the direction along the thickness of the reflective holographic grating. In some embodiments, the refractive index modulation of the reflective holographic grating has a maximum magnitude in a center region of the reflective holographic grating in the direction along the thickness of the reflective holographic grating. In some embodiments, the thickness of the reflective holographic grating is at least 15 µm and the maximum magnitude of the refractive index modulation is at least 0.035. In some embodiments, the refractive index modulation of the reflective holographic grating is zero in a region adjacent to the surface of the substrate. In some embodiments, the reflective holographic grating is asymmetrically apodized with respect to a center of the reflective holographic grating in the direction along the thickness of the reflective holographic grating. In some embodiments, the reflective holographic grating may include a photopolymer layer that is configured to be laminated on the surface of the substrate. In some embodiments, the photopolymer layer may include a plurality of layers of different photopolymer materials having different amplitudes of refractive index modulation.

In some embodiments, the eye-tracking system may also include a light source configured to emit the infrared light in the first wavelength range for eye-tracking, where the reflective holographic grating may be configured to reflectively diffract the infrared light in the first wavelength range from the light source to an eye of a user. In some embodiments, the eye-tracking system may also include an infrared camera, where the reflective holographic grating is configured to reflectively diffract the infrared light in the first wavelength range from an eye of a user to the infrared camera. In some embodiments, the substrate may include at least one of a glass, quartz, plastic, polymer, ceramic, or crystal substrate, and the surface of the substrate may include a curved or flat surface. In some embodiments, the optical artifacts in the visible light may include rainbow ghost images.

According to some embodiments, an optical device for a near-eye display may include a substrate and a holographic grating conformally coupled to a surface of the substrate. The substrate may be transparent to visible light and infrared light and configured to be placed in front of an eye of a user of the near-eye display. A refractive index modulation of the holographic grating may be apodized in a surface-normal direction of the substrate to reduce optical artifacts in the visible light. In some embodiments, a magnitude of the refractive index modulation of the holographic grating in the surface-normal direction of the substrate is characterized by a bell-shaped curve. In some embodiments, a magnitude of the refractive index modulation of the holographic grating is asymmetrical in the surface-normal direction of the substrate. In some embodiments, the holographic grating includes a photopolymer layer configured to be laminated on the surface of the substrate. In some embodiments, a thickness of the photopolymer layer may be greater than 15 µm; and a maximum refractive index modulation of the holographic grating may be at least 0.035.

In some embodiments of the optical device, the holographic grating may include a reflective holographic grating configured to transmit the visible light and reflectively diffract infrared light in a first wavelength range for eye tracking. In some embodiments, the holographic grating may be configured to reflectively diffract the infrared light in the first wavelength range from an infrared light source to the eye of the user or from the eye of the user to an infrared camera. In some embodiments, the substrate is configured to guide display light within the substrate through total internal reflection, and the holographic grating includes a grating coupler configured to couple at least a portion of the display light out of the substrate.

According to certain embodiments, a method of fabricating an optical device for a near-eye display may include obtaining a photopolymer layer on a support substrate, where the photopolymer layer is sensitive to light in a first wavelength range; and projecting, from a first side of the photopolymer layer, a first light beam in the first wavelength range on the photopolymer layer. A first wavelength of the first light beam, a first intensity of the first light beam, and a light absorption rate of the photopolymer layer may be configured such that the first intensity of the first light beam gradually decreases in the photopolymer layer in a direction along a thickness of the photopolymer layer from the first side according to a predetermined light intensity profile to apodize the photopolymer layer in the direction along the thickness of the photopolymer layer.

In some embodiments, projecting the first light beam on the photopolymer layer may include positioning a prism adjacent to the photopolymer layer, where a refractive index of the prism is greater than 1.33; and projecting the first light beam on the prism, where the prism refracts the first light beam on the photopolymer layer. In some embodiments, the method may also include recording a holographic grating in the apodized photopolymer layer, where the holographic grating may be apodized in the direction along the thickness of the photopolymer layer and may be configured to transmit light in the first wavelength range and reflectively diffract infrared light for eye tracking.

In some embodiments, the method may also include projecting, from a second side of the photopolymer layer, a second light beam in the first wavelength range on the photopolymer layer. A second wavelength of the second light beam, a second intensity of the second light beam, and the light absorption rate of the photopolymer layer may be configured such that the second intensity of the second light beam gradually decreases in the photopolymer layer in the direction along the thickness of the photopolymer layer from the second side to apodize the photopolymer layer in the direction along the thickness of the photopolymer layer. The first wavelength and the second wavelength may be identical or different. The photopolymer layer may be asymmetrically apodized in the direction along the thickness of the photopolymer layer.

In some embodiments, the first light beam and the second light beam may be coherent, and the first light beam and the second light beam may interfere in the photopolymer layer to form an apodized holographic grating in the photopolymer layer. In some embodiments, a magnitude of a refractive index modulation of the apodized holographic grating in the direction along the thickness of the photopolymer layer may be characterized by a bell-shaped curve. In some embodiments, the refractive index modulation of the apodized holographic grating may be zero in a region adjacent to the support substrate. In some embodiments, the apodized holographic grating may be configured to perform at least one of reflectively diffracting infrared light for eye tracking or reducing optical artifacts in visible light.

In some embodiments, the method may also include recording a holographic grating in the apodized photopolymer layer. In some embodiments, the method may also include desensitizing the photopolymer layer such that the photopolymer layer is not photosensitive to light in the first wavelength range.

In some embodiments, the photopolymer layer may include a photosensitive material configured to absorb the first light beam to initiate polymerization in the photopolymer layer, and a light absorption material configured to absorb the first light beam without initiating the polymerization in the photopolymer layer. In some embodiments, the photopolymer layer may include a plurality of layers of different photopolymer materials that have different maximum achievable amplitudes of refractive index modulation.

According to certain embodiments, a method of fabricating an optical device for a near-eye display may include forming a photopolymer layer on a substrate of the optical device, where the photopolymer layer is sensitive to light in a first wavelength range; forming a light pattern having a non-uniform intensity in the first wavelength range in the photopolymer layer to selectively desensitize the photopolymer layer; and recording an apodized holographic grating in the selectively desensitized photopolymer layer using coherent light in the first wavelength range. The apodized holographic grating may be configured to reflectively diffract infrared light that is outside of the first wavelength range to or from an eye of a user of the near-eye display.

In some embodiments, forming the light pattern having the non-uniform intensity in the first wavelength range in the photopolymer layer may include projecting, from a first side of the photopolymer layer, a first light beam in the first wavelength range on the photopolymer layer; and projecting, from a second side of the photopolymer layer, a second light beam in the first wavelength range on the photopolymer layer. A first wavelength of the first light beam, a second wavelength of the second light beam, a first intensity of the first light beam, a second intensity of the second light beam, and an light absorption rate of photopolymer layer may be configured such that the first intensity of the first light beam gradually decreases in the photopolymer layer from the first side according to a first light intensity profile and the second intensity of the second light beam gradually decreases in the photopolymer layer from the second side according to a second light intensity profile.

In some embodiments, an intensity of the light pattern having the non-uniform intensity in the photopolymer layer may be characterized by a bell-shaped curve in a direction along a thickness of the photopolymer layer. In some embodiments, the first light beam and the second light beam are coherent, and the coherent light for recording the apodized holographic grating includes the first light beam and the second light beam. In some embodiments, the first light beam and the second light beam have different wavelengths. In some embodiments, the first light beam and the coherent light for recording the apodized holographic grating have different wavelengths.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 9A illustrates an example of a holographic deflector. FIG. 9B illustrates the refractive index of the holographic deflector of FIG. 9A along a thickness direction of the holographic deflector. FIG. 9C illustrates the transmissivity and reflectivity of the holographic deflector as a function of the wavelength of the incident light.

FIG. 11A illustrates an example of a holographic deflector including an apodized reflective holographic grating according to certain embodiments. FIG. 11B illustrates the refractive index of the holographic deflector of FIG. 11A along a thickness direction of the holographic deflector. FIG. 11C illustrates the transmissivity and reflectivity as a function of the wavelength of the incident light for the reflective holographic grating shown in FIG. 11A.

FIG. 15A illustrates an example of a method for apodizing a holographic grating using the recording beams according to certain embodiments. FIG. 15B illustrates an example of an apodized holographic grating fabricated using the method described in FIG. 15A according to certain embodiments. FIG. 15C illustrates the refractive index of the apodized holographic grating along a thickness direction of the apodized holographic grating.

FIG. 16A illustrates an example of a method of desensitizing a holographic recording material using incoherent light according to certain embodiments. FIG. 16B illustrates an example of an method of recording an apodized holographic grating in a desensitized holographic recording material according to certain embodiments. FIG. 16C illustrates an example of an apodized holographic grating fabricated using the method described with respect to FIGS. 16A and 16B according to certain embodiments.

Figure 1:
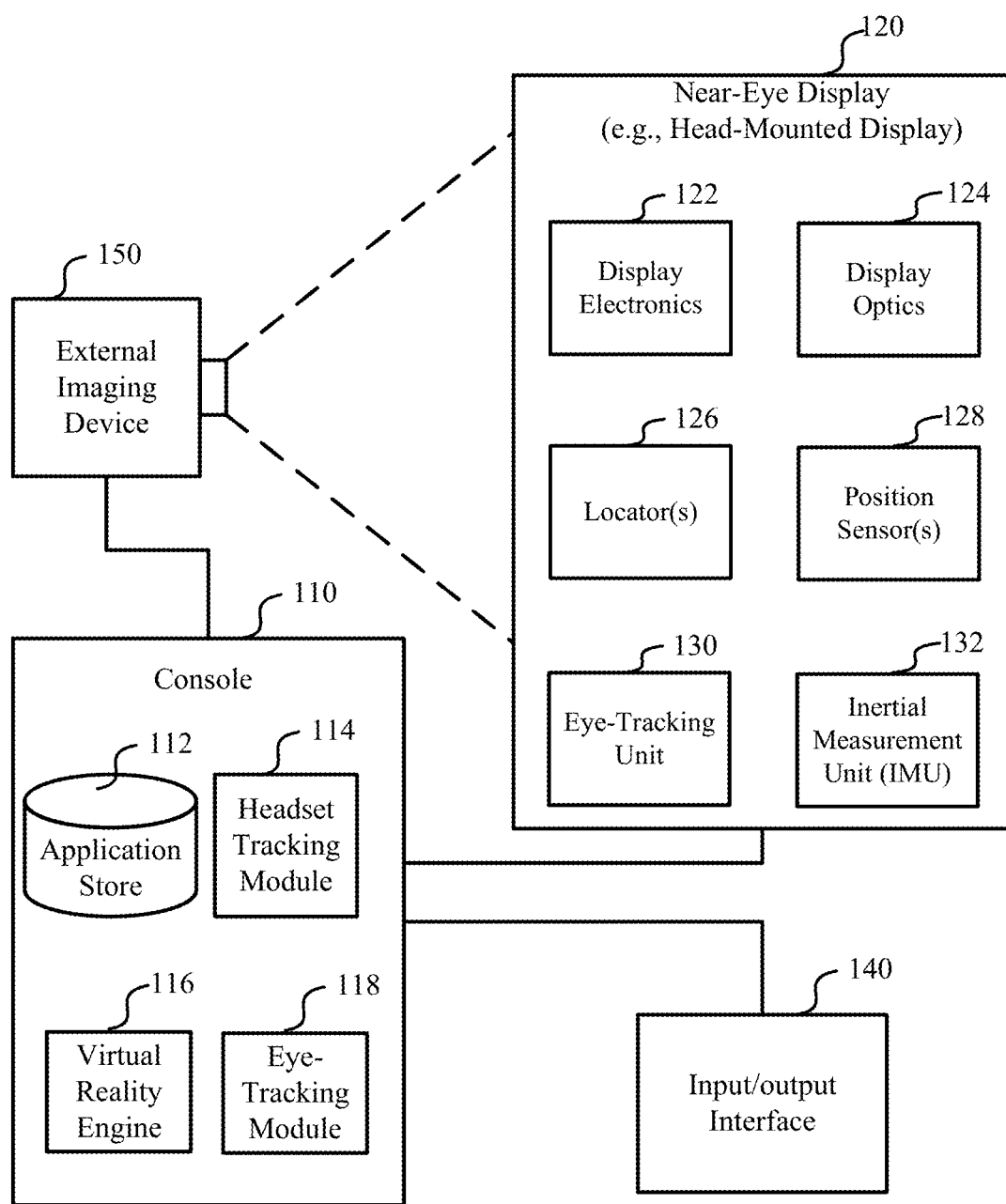
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to artificial reality systems, and more specifically, to eye-tracking subsystems for artificial reality systems. According to certain embodiments, an optical combiner of an artificial reality system includes a holographic optical element configured to reflect light for eye tracking. The refractive index modulation of the holographic optical element is apodized to reduce optical artifacts that may otherwise be caused by the holographic optical element. Various inventive embodiments are described herein, including systems, modules, devices, components, methods, and the like.

In an artificial reality system, such as a virtual reality (VR), augmented reality (AR), or mixed reality (MR) system, to improve user interaction with presented content, the artificial reality system may track the user's eye and modify or generate content based on a location or a direction in which the user is looking at. Tracking the eye may include tracking the position and/or shape of the pupil and/or the cornea of the eye, and determining the rotational position or gaze direction of the eye. To track the eye, an eye-tracking system of the near-eye display system may include an illumination subsystem that can illuminate the user's eye using light sources mounted to or inside the artificial reality system. The eye-tracking system may also include an imaging subsystem that includes an imaging device (e.g., a camera) for capturing light reflected by various surfaces of the user's eye. Light that is diffusively reflected (e.g., scattered) by, for example, the iris of the user's eye may affect the contrast of the captured image in the iris or pupil region, which may be used to determine the edges of the iris or pupil and the center of the pupil. Light that is reflected specularly off the cornea of the user's eye may result in "glints" in the captured image. The glints may also be referred to as the first Purkinje images or corneal reflections. Techniques such as centroiding algorithms may be used to determine the locations of the glints on the eye in the captured image. For example, the centroiding algorithm may determine the center of the glint by finding the pixel location with the most energy in a local neighborhood. The rotational position (e.g., the gaze direction) of the eye may then be determined based on the locations of the glints relative to a known feature of the eye (e.g., the center of the pupil) within the captured image.

In the illumination subsystem, one or more light sources (e.g., LEDs) may be positioned at the periphery of the user's field of view (e.g., along the circumference of the viewing optics or on a frame of the near-eye display system) to provide light for illuminating the user's eye. In some embodiments, one or more miniature light sources may be positioned within the user's field of view. In the imaging subsystem, one or more imaging devices (e.g., cameras) may also be placed at the periphery of the user's field of view. In many applications, the viewing direction (e.g., gazing angle) may need to be determined with a high accuracy, such as less than 5°, less than 1°, or better. The eye-tracking system may also need to be robust in order to accommodate for extreme changes in the viewing direction and variations in facial features surrounding user's eyes, such as cases where portions of the eye, including portions of the iris or the pupil, may be obscured by, for example, eyelids or eye lashes.

According to certain embodiments disclosed herein, an eye-tracking subsystem for an artificial reality system may include one or more light sources configured to emit illumination light, one or more imaging devices (e.g., a camera) for capturing images of the user's eye, and a substrate including one or more reflective holographic gratings that are in the field of view of the user's eye and are configured to direct the illumination light from the one or more light sources to the user's eyes, and/or to direct the illumination light reflected or diffused by the user's eyes to the one or more imaging devices. The reflective holographic gratings are transparent to visible light, and thus can be placed in the field of view of the user's eye, such as being conformably laminated on a substrate used as a waveguide-based display that can combine display light and ambient light for augmented reality application. The reflective holographic gratings may help to avoid light obscurations and improve the accuracy and reliability of the eye tracking. The reflective holographic gratings may reflectively diffract eye-tracking light (e.g., infrared light). The reflective holographic gratings may be apodized in the thickness direction to reduce optical artifacts (e.g., rainbow effects) that may otherwise be caused by the gratings due to light diffraction and dispersion.

In some embodiments, the apodized reflective holographic gratings may be recorded using light of a first wavelength that is different from the light used for eye-tracking. The holographic grating material (e.g., photopolymers) may have certain light absorption characteristics and the coherent recording light beams may have certain intensities, such that the intensities of the coherent recording light beams inside the holographic grating material may be a desired function of the depth inside the holographic grating material. In some embodiments, in order to achieve the desired recording light intensity function in the holographic grating material, the holographic grating material may include a certain amount of light absorption materials that can absorb the recording light beams but may not initiate photopolymerization in the holographic grating material. As such, the intensity of the interference pattern and thus the refractive index modulation in the holographic recording material may also be a function of the depth inside the holographic recording material, such that the magnitude of the refractive index modulation in the reflective holographic grating may be apodized during the holographic recording. In some embodiments, the holographic grating material may be exposed to coherent or incoherent light before or after the holographic grating recording to apodize the reflective holographic gratings. In some embodiments, the degree or the profile of the apodization can be tune by changing the wavelength and/or the intensities of the light used for the apodization.

As used herein, visible light may refer to light with a wavelength between about 380 nm to about 750 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS), a charge-coupled device (CCD) sensor, or an InGaAs sensor), such as between 830 nm and 860 nm, between 930 nm and 980 nm, or between about 750 nm to about 1000 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

As used herein, a holographic grating may include a holographic material layer (e.g., photopolymer layer) with refractive index modulation, and may or may not include a substrate. For example, in some embodiments, a holographic grating may refer to the photopolymer layer with refractive index modulation. In some embodiments, a holographic grating may also include a substrate that supports the photopolymer layer. In some embodiments, a holographic grating may include two substrates with the photopolymer layer between the two substrates.

As used herein, an apodized grating may refer to a grating where the amplitude of the refractive index modulation may vary at different regions. The apodization may be in one dimension, two dimensions, or three dimensions, where the amplitude of the refractive index modulation may vary in one, two, or three directions, such as any combination of the thickness direction, width direction, or length direction of the grating. The apodized grating may be apodized symmetrically or asymmetrically in a direction, where the amplitude of the refractive index modulation may vary according to any desire curve or profile.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional external imaging device 150, and an optional input/output interface 140 that may each be coupled to an optional console 110. While FIG. 1 shows example artificial reality system environment 100 including one near-eye display system 120, one external imaging device 150, and one input/output interface 140, any number of these components may be included in artificial reality system environment 100, or any of the components may be omitted. For example, there may be multiple near-eye display systems 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking system 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120/

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking system 130 may include one or more eye-tracking systems. Eye tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking system 130 may include a non-coherent or coherent light source (e.g., a laser diode) emitting light in the visible spectrum or infrared spectrum, and a camera capturing the light reflected by the user's eye. As another example, eye-tracking system 130 may capture reflected radio waves emitted by a miniature radar unit. Eye-tracking system 130 may use low-power light emitters that emit light at frequencies and intensities that would not injure the eye or cause physical discomfort. Eye-tracking system 130 may be arranged to increase contrast in images of an eye captured by eye-tracking system 130 while reducing the overall power consumed by eye-tracking system 130 (e.g., reducing power consumed by a light emitter and an imaging system included in eye-tracking system 130). For example, in some implementations, eye-tracking system 130 may consume less than 100 milliwatts of power.

In some embodiments, eye-tracking system 130 may include one light emitter and one camera to track each of the user's eyes. Eye-tracking system 130 may also include different eye-tracking systems that operate together to provide improved eye tracking accuracy and responsiveness. For example, eye-tracking system 130 may include a fast eye-tracking system with a fast response time and a slow eye-tracking system with a slower response time. The fast eye-tracking system may frequently measure an eye to capture data used by an eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking system 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately $-1°$ to $8°$ laterally and about $±4°$ vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system due to, for example, a shift in the position of near-eye display system 120 on a user's head, may also be detected. Eye-tracking system 130 may also detect the torsion of the eye and the rotation of the eye about the pupillary axis. Eye-tracking system 130 may use the detected torsion of the eye to estimate the orientation of the foveal axis from the pupillary axis. In some embodiments, eye-tracking system 130 may also track a change in the shape of the eye, which may be approximated as a skew or scaling linear transform or a twisting distortion (e.g., due to torsional deformation). In some embodiments, eye-tracking system 130 may estimate the foveal axis based on some combinations of the angular orientation of the pupillary axis, the translation of the eye, the torsion of the eye, and the current shape of the eye.

In some embodiments, eye-tracking system 130 may include multiple emitters or at least one emitter that can project a structured light pattern on all portions or a portion of the eye. The structured light pattern may be distorted due to the shape of the eye when viewed from an offset angle. Eye-tracking system 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking system 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display system 120 for presentation to the user in accordance with information received from one or more of external imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display system 120 using slow calibration information from external imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100 using one or more calibration parameters, and may adjust one or more calibration parameters to reduce errors in determining the position of near-eye display system 120. For example, headset tracking module 114 may adjust the focus of external imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking system 130 and determine the position of the user's eye based on the eye-tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
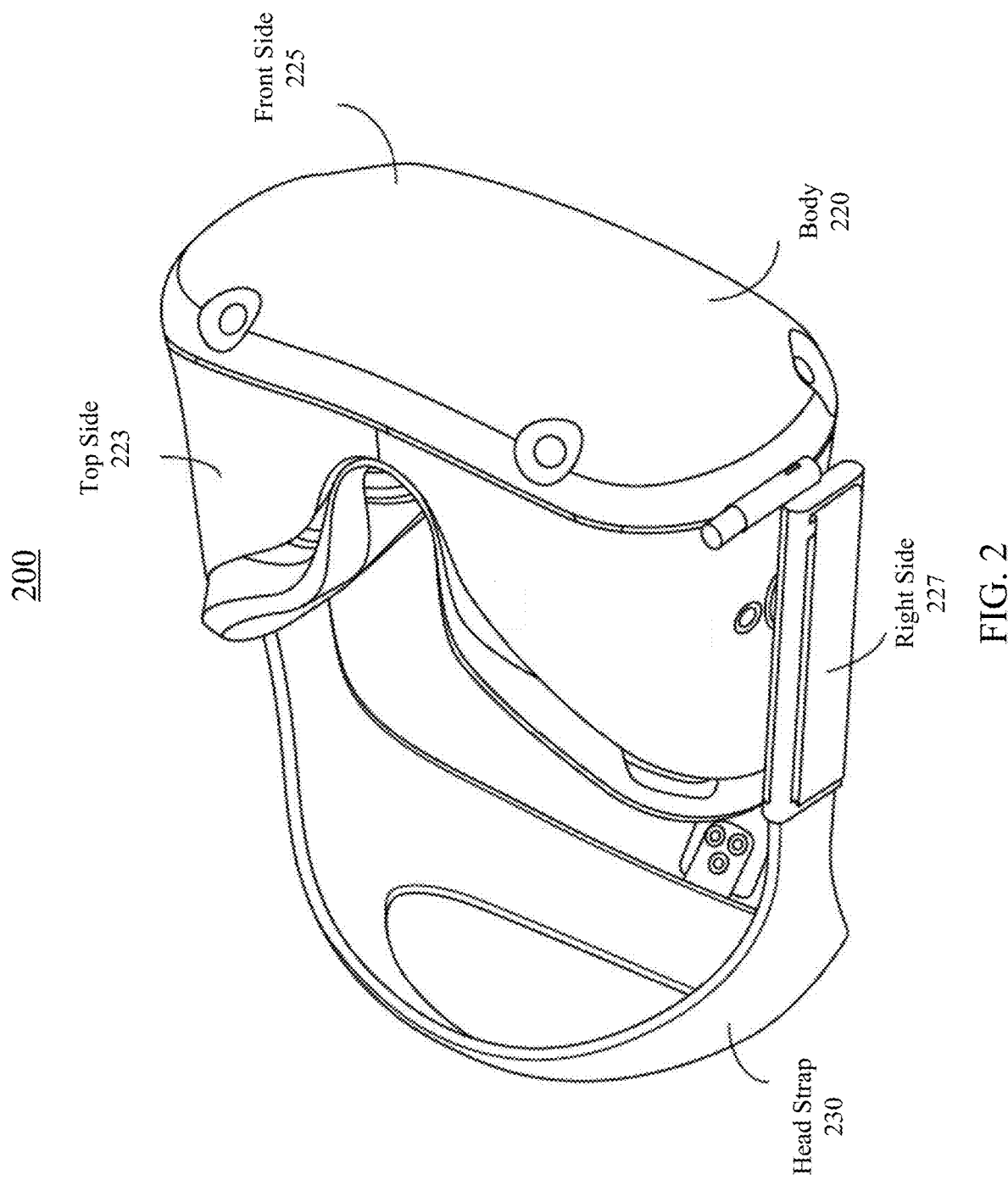
FIG. 2 is a perspective view of an example of a near-eye display system in the form of a head-mounted display (HMD) device for implementing some of the examples disclosed herein.

FIG. 2 is a perspective view of an example of a near-eye display system in the form of a head-mounted display (HMD) device 200 for implementing some of the examples disclosed herein. HMD device 200 may be a part of, e.g., a virtual reality (VR) system, an augmented reality (AR)

system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye-tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
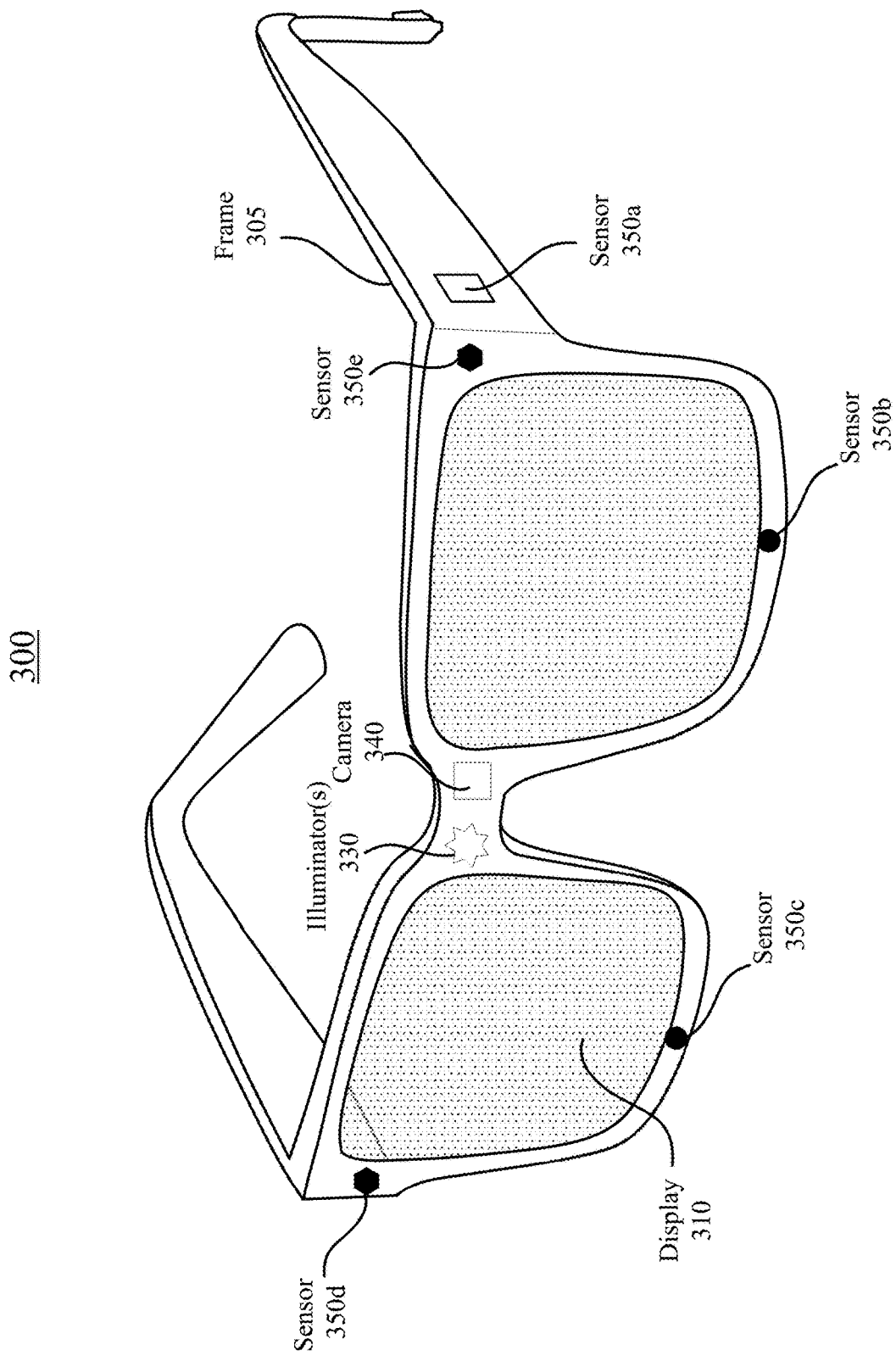
FIG. 3 is a perspective view of an example of a near-eye display system in the form of a pair of glasses for implementing some of the examples disclosed herein.

FIG. 3 is a perspective view of an example of a near-eye display system 300 in the form of a pair of glasses for implementing some of the examples disclosed herein. Near-eye display system 300 may be a specific implementation of near-eye display system 120 of FIG. 1, and may be configured to operate as a virtual reality display, an augmented reality display, and/or a mixed reality display. Near-eye display system 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display system 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display system 300, and/or to provide an interactive VR/AR/MR experience to a user of near-eye display system 300. In some embodiments, sensors 350a-350e may also be used for stereoscopic imaging.

In some embodiments, near-eye display system 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display system 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
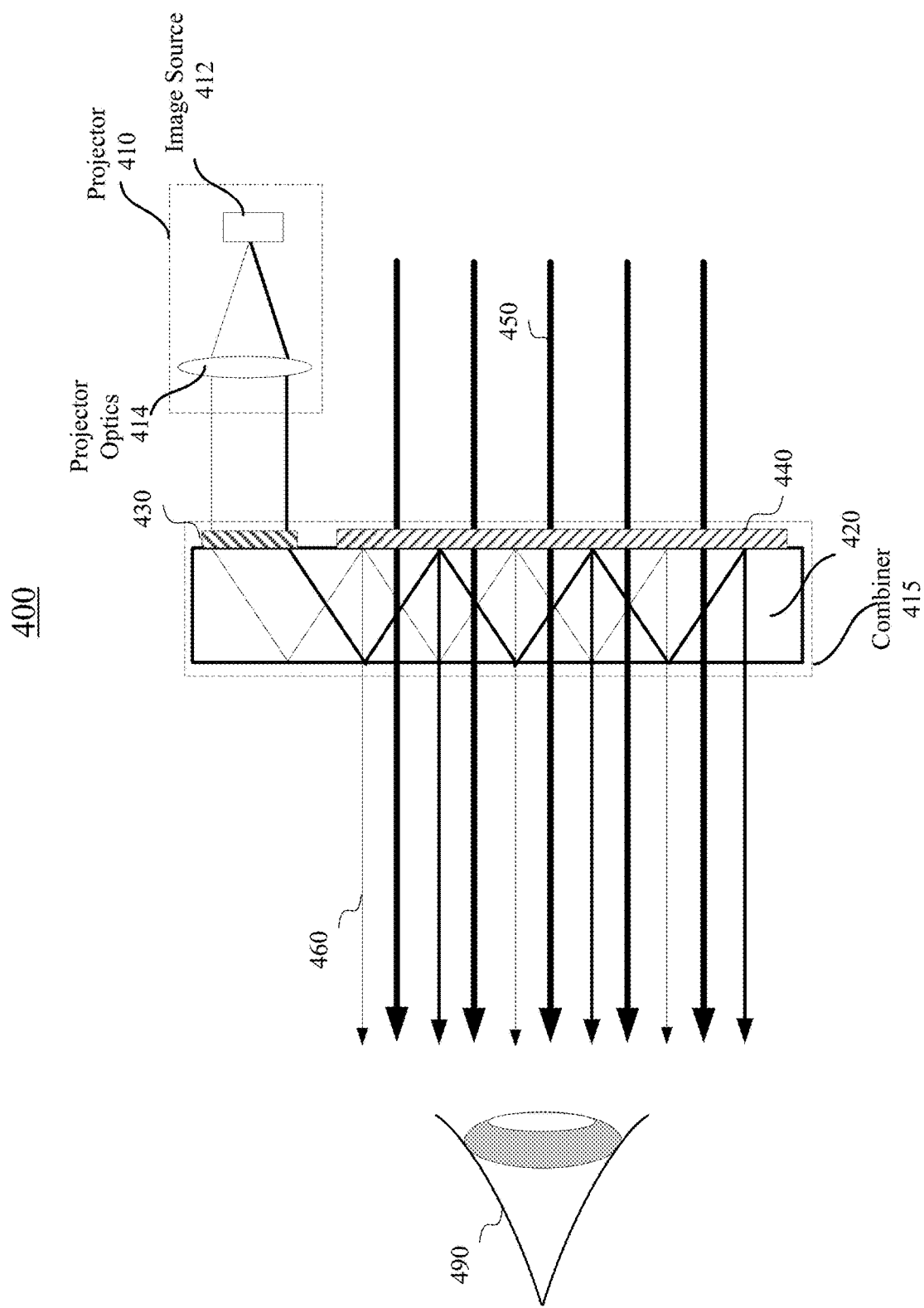
FIG. 4 illustrates an example of an optical see-through augmented reality system using a waveguide display that includes an optical combiner according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical elements (DOE) (e.g., a surface-relief grating), a slanted surface of substrate 420, or a refractive coupler (e.g., a wedge or a prism). Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

There may be several types of eye measurements for determining user intent, cognitive processes, behavior, attention, etc. These measurements may include, for example, measurement related to fixations, where the eyes are stationary between movements and visual input may occur. Fixation-related measurement variables may include, for example, total fixation duration, mean fixation duration, fixation spatial density, number of areas fixated, fixation sequences, and fixation rate. The eye measurements may also include measurements of saccades, which are rapid eye movements that occur between fixations. Saccade related parameters may include, for example, saccade number, amplitude, velocity, acceleration, and fixation-saccade ratio. The eye measurements may also include measurements of scanpath, which may include a series of short fixations and saccades alternating before the eyes reach a target location on the display screen. Movement measures derived from scanpath may include, for example, scanpath direction, duration, length, and area covered. The eye movement measurements may further include measuring the sum of all fixations made in an area of interest before the eyes leave that area or the proportion of time spent in each area. The eye measurements may also include measuring pupil size and blink rate, which may be used to study cognitive workload.

In addition, as described above, in an artificial reality system, to improve user interaction with presented content, the artificial reality system may track the user's eye and modify or generate content based on a location or a direction in which the user is looking at. Tracking the eye may include tracking the position and/or shape of the pupil and/or the cornea of the eye, and determining the rotational position or gaze direction of the eye. One technique (referred to as Pupil Center Corneal Reflection or PCCR method) involves using NIR LEDs to produce glints on the eye cornea surface and then capturing images/videos of the eye region. Gaze direction can be estimated from the relative movement between the pupil center and glints.

Figure 5:
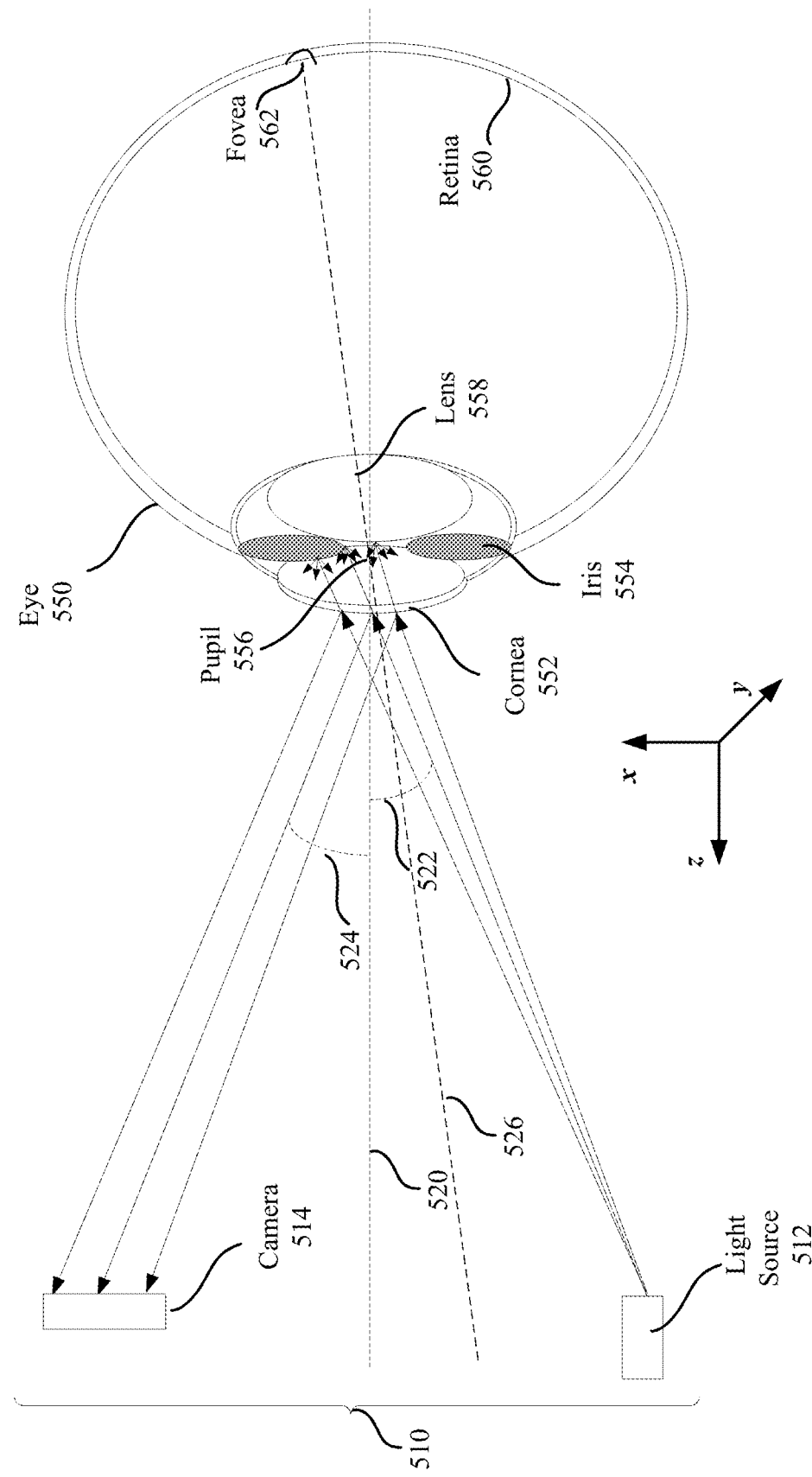
FIG. 5 illustrates light reflections and scattering by an eye during eye tracking.

FIG. 5 illustrates light reflections and scattering by an eye 550 during eye tracking using an eye-tracking system 510, such as eye-tracking system 130. Eye-tracking system 510 may include a light source 512 and a camera 514 as described above. In other embodiments, eye-tracking system 510 may include different and/or additional components than those depicted in FIG. 5. Light source 512 may include, for example, a laser, an LED, or VCSELs, and may be mounted at a laser angle 522 relative to a surface normal vector 520 of eye 550. Surface normal vector 520 is orthogonal to a portion of the surface (e.g., cornea 552) of eye 550 illuminated by light source 512. In the example shown in FIG. 5, surface normal vector 520 may be the same as the pupillary axis (also referred to as optical axis, which may be a line passing through the center of pupil 556 and the center of cornea 552) of eye 550. Laser angle 522 may be measured between surface normal vector 520 and a line from a center of the portion of the surface of eye 550 illuminated by light source 512 to a center of the output aperture of light source 512. Camera 514 may be mounted at a camera angle 524 relative to surface normal vector 520 of eye 550. Camera angle 524 may be measured between surface normal vector 520 and a line from a center of the portion of the surface of eye 550 illuminated by light source 512 to a center of the image sensor or light input aperture of camera 514. In some embodiments, a difference between laser angle 522 and camera angle 524 is less than a threshold amount so that camera 514 may capture images via specular reflections of light incident on cornea 552 of eye 550, which may beneficially increase contrast of the resulting image and minimize light power loss and power consumption.

The light emitted by light source 512 may substantially uniformly illuminate a portion of the eye surface (e.g., cornea 552). A portion of the emitted light may be reflected specularly by cornea 552 of eye 550 and captured by camera 514. In some cases, the light incident on eye 550 may propagate into the eye for a small distance before being reflected. For example, at least some portions of the light may enter eye 550 through cornea 552 and reach iris 554, pupil 556, lens 558, or retina 560 of eye 550. Because some interfaces within eye 550 (e.g., surface of iris 554) may be rough (e.g., due to features such as capillaries or bumps), the interfaces within eye 550 may scatter the incident light in multiple directions. Different portions of the eye surface and the interfaces within eye 550 may have different patterns of features. Thus, an intensity pattern of the light reflected by eye 550 may depend on the pattern of features within the illuminated portion of eye 550, which may allow identification of the portions of the eye (e.g., iris 554 or pupil 556) from the intensity pattern.

Camera 514 may collect and project light reflected by the illuminated portion of eye 550 onto an image sensor of camera 514. Camera 514 may also correct one or more optical errors (such as those described with respect to the display optics 124) to improve the contrast and other properties of the images captured by the image sensor of camera 514. In some embodiments, camera 514 may also magnify the reflected light. In some embodiments, camera 514 may enlarge the images. The image sensor of camera 514 may capture incident light focused by a lens assembly of camera 514. Thus, camera 514 may effectively capture an image of light source 512 (the emitted light of which is reflected specularly by the cornea of the eye) reflected by the eye, resulting in a "glint" in the captured image. Because of the scattering (diffusive reflections) at some interfaces of the eye, light incident on a point of the image sensor may include light reflected from multiple points within the illuminated portion of eye 550, and thus may be the result of the interference of the light reflected from the multiple points. Thus, in some embodiments, the image sensor of camera 514 may also capture a diffraction or speckle pattern formed by a combination of light reflected from multiple points of the surface of eye 550.

Each pixel of the image sensor may include a light-sensitive circuit that can output a current or voltage signal corresponding to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 514 may include a complementary metal-oxide semiconductor (CMOS) pixel array, which may be used with light having a wavelength less than about 750 nm. As another example, the image sensor of camera 514 may include an indium gallium arsenide (InGaAs) alloy pixel array or a charge-coupled device (CCD). Such an image sensor may be used with a laser emitting light having a wavelength between about 900 nm and about 1160 nm.

In some embodiments, to determine a position change of eye 550, an eye-tracking module (e.g., eye-tracking system 130 or eye-tracking module 118 of FIG. 1) may determine a pixel shift between images. Multiplying the pixel shift by a calibrated distance per pixel may allow the eye-tracking module to determine a distance the surface (e.g., cornea 552) of eye 550 has shifted. For example, if the glint captured in one image is shifted by two pixels relative to the glint captured in a previous image, and each pixel corresponds to a distance of 10 micrometers at the surface of eye 550, the surface of eye 550 may have moved about 20 micrometers.

In some embodiments, eye-tracking techniques used in head-mounted devices may be video-based and may be performed based on appearance or features. For example, the appearance-based techniques may use certain mapping functions to map the entire eye image or a region of interest of the eye image to a gaze direction or point-of-gaze. The mapping function may have a high-dimensional input (e.g., the intensities of image pixels) and a low-dimensional output (e.g., the gaze direction, point-of-gaze, etc.). These mapping functions may be based on machine learning models, such as convolutional neural networks (CNNs).

The feature-based techniques may perform feature extraction and gaze estimation using the extracted features. The features can be any one or more of the following: pupil center, iris center, pupil-iris boundary, iris-sclera boundary, first Purkinje images (reflections off the front surface of the cornea, known as corneal reflections or glints), fourth Purkinje images (reflections of the back surface of the crystalline lens), eye corners, and the like. These features may be extracted using computer vision techniques (e.g., intensity histogram analysis, thresholding, edge detection, blob segmentation, convex-hull, morphological operations, shape fitting, deformable templates, centroiding, etc.) or machine-learning techniques, or any combination. The gaze estimation techniques can be interpolation-based or model-based. The interpolation-based techniques may use certain mapping functions (e.g., second degree bivariate polynomial) to map eye features (e.g., pupil center or pupil center-corneal reflection (PCCR) vector) to the gaze direction. The coefficients of these mapping functions may be obtained through a personal calibration procedure that may involve collecting data while the user fixates at a sequence of fixation targets with known coordinates. This calibration may be performed for each subject and each session, and may sometimes be performed multiple times in each session, because the calibration may be sensitive to slippage of the head-mounted device relative to the head. The mapping functions may then use the calibration data points and interpolation techniques to determine the gaze direction. The model-based methods may use models of the system (e.g., camera(s) and/or light source(s)) and the eye that may include actual physical system parameters and anatomical eye parameters to determine a 3-D gaze from a set of eye features (e.g., pupil boundary and multiple corneal reflections) according to 3-D geometry. Model-based techniques may perform both a one-time system calibration and a one-time personal calibration for each user. The data collection procedure for the personal calibration may be similar to that of the interpolation-based methods.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 550, such as the pupil or the iris. For example, the eye-tracking module may determine the eye position by retrieving a reference eye position associated with the feature (which was also captured in a reference image), determining a pixel shift between the feature in the captured image and the feature in the reference image, and determining the eye position based on the determined pixel shift with respect to the reference eye position and the calibrated distance per pixel as described above.

As discussed above, camera 514 may effectively capture an image of light source 512 reflected by cornea 552 of eye 550. In some embodiments, the eye-tracking module may determine a gaze direction of the user's eye based on the locations of the images of the light sources (e.g., glints) on cornea 552 in the captured image. The gaze direction may be determined by a foveal axis 526 of the user's eyes, where foveal axis 526 (also referred to as "visual axis") may be a line passing through the center of pupil 556 and the center of fovea 562.

Figure 6:
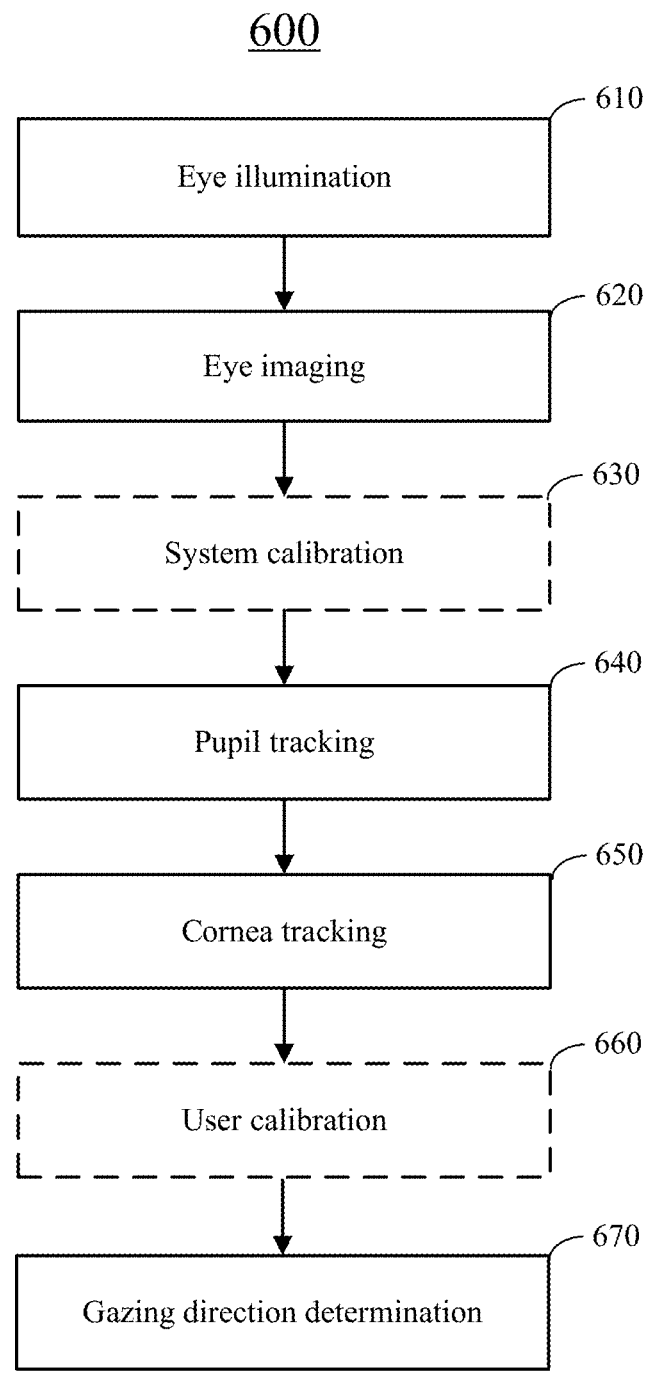
FIG. 6 is a simplified flow chart illustrating an example of a method for tracking the eye of a user of a near-eye display system according to certain embodiments.

FIG. 6 is a simplified flow chart 600 illustrating an example of a method for tracking the eye of a user of a near-eye display system according to certain embodiments. The operations in flow chart 600 may be performed by, for example, eye-tracking system 130 or 510 described above. At block 610, one or more light sources may illuminate the user's eye. In various embodiments, the light sources may be located in the field of view of the user's eye or at a periphery of the field of view of the user's eye. In some embodiments, a light source may be located at the periphery of the field of view of the user's eye, and the light from the light source may be guided and directed to the user's eye from locations in the field of view of the user's eye.

At block 620, an imaging device (e.g., a camera) may collect light reflected by the user's eye and generate one or more images of the user's eye. As described above, the cornea of the user's eye may specularly reflect the illumination light, while some portions of the user's eye (e.g., iris) may diffusively scatter the illumination light. The images of the user's eye may include portions (e.g., the iris region and/or the pupil portion) where the contrast may be different due to the scattering of the illumination light. The images of the user's eye may also include glints caused by the specular reflection of the illumination light by the user's cornea.

Figures 7A, 7B:
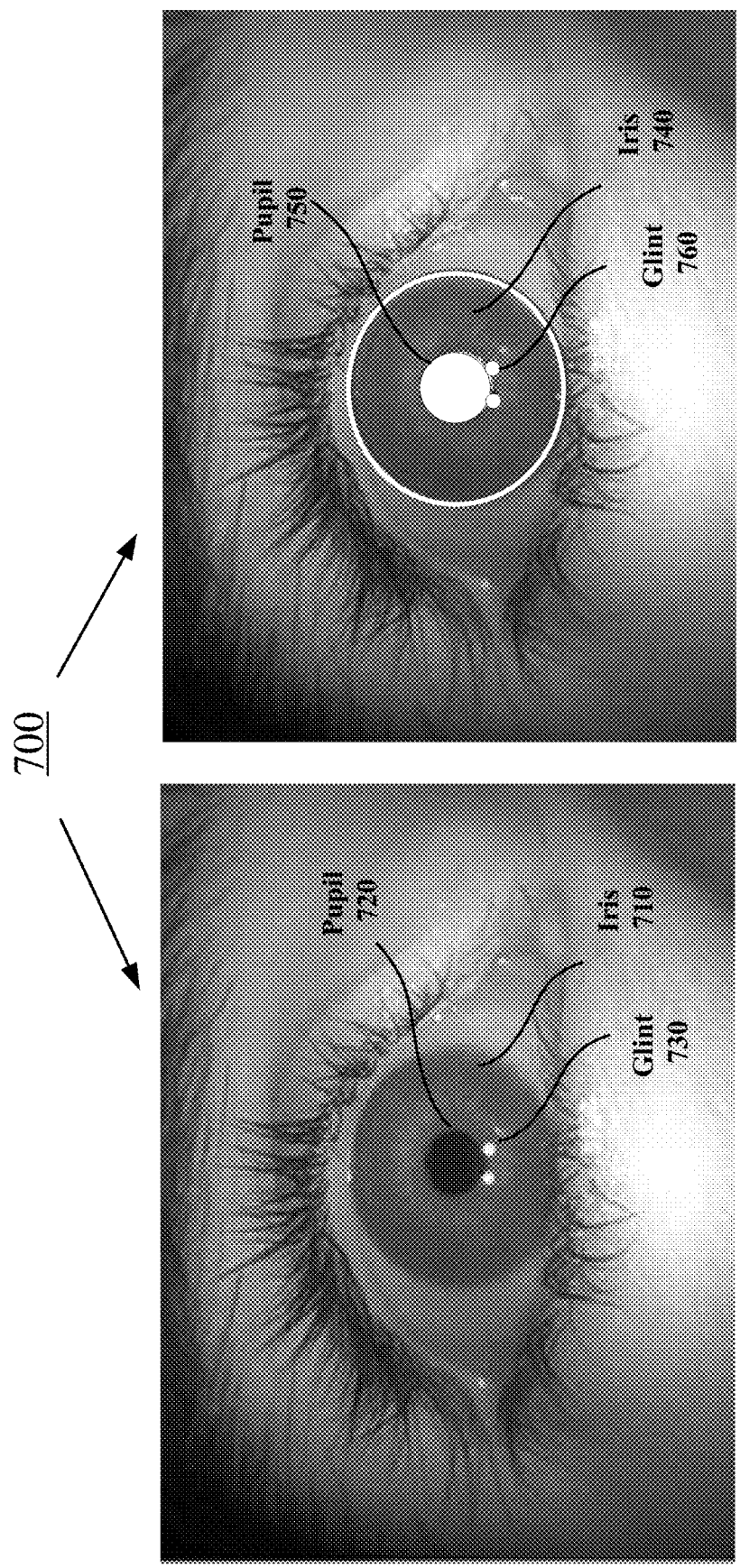
FIG. 7A illustrates an example of an image of a user's eye captured by a camera for eye tracking according to certain embodiments.
FIG. 7B illustrates an example of an identified iris region, an example of an identified pupil region, and examples of glint regions identified in an image of the user's eye according to certain embodiments.

FIG. 7A illustrates an example of an image 700 of a user's eye captured by a camera according to certain embodiments. Image 700 includes an iris region 710, a pupil region 720, and multiple glints 730. Glints 730 may be caused by illumination light specularly reflected off the cornea of the user's eye.

Optionally, at block 630, the eye-tracking system may perform system calibration to improve the precision and accuracy of eye tracking as described above with respect to eye-tracking module 118. The system calibration may include, for example, calibrating the eye tracking optical path (such as extrinsic (e.g., position or orientation) and intrinsic camera parameters), positions of the light sources, the display optical path (e.g., position of the display, extrinsic and intrinsic parameters of the display optics, etc.)

At block 640, the location of the center of the pupil of the user's eye may be determined based on the scattering of the illumination light by, for example, the iris of the user's eye. As described above, the boundaries of the pupil and/or the iris may be determined based on image segmentation of the pupil region in the captured image as shown in FIG. 7A. Based on the boundaries of the pupil, the location of the center of the pupil may be determined.

At block 650, the position of the cornea of the user's eye may be determined based on the locations of the glints in the captured image of the user's eye as shown in FIG. 7A. As described above, the locations of the glints may be determined using, for example, a Gaussian centroiding technique. The accuracy and precision of the determined locations of the glints may depend on the locations of the light sources (or virtual or effective light sources). Based on the locations of two or more glints, the position of the cornea may be determined using, for example, nonlinear optimization and based on the assumption that the cornea (in particular, the corneal apex) is close to a sphere.

FIG. 7B illustrates an example of an identified iris region 740, an example of an identified pupil region 750, and examples of glint regions 760 identified in image 700 of the user's eye according to certain embodiments. As illustrated, edges of iris region 740 and pupil region 750 are identified. The center of pupil region 720 may then be determined based on the edges of pupil region 750 and/or iris region 740. The locations of glints 730 can also be determined based on the locations of glint regions 760 identified in image 700. Based on the locations of glint regions 760, the position of the center of the cornea may be determined.

Optionally, at block 660, the eye-tracking system may perform user calibration to determine certain eye calibration parameters for improving the precision and accuracy of eye tracking as described above with respect to eye-tracking module 118 and FIG. 5. The user calibration may include, for example, determining the eye model parameters (e.g., anatomical eye parameters) or the coefficients of some mapping functions that may not depend on a particular eye parameter. Other examples of the eye calibration parameters may include an estimated average eye radius, an average corneal radius, an average sclera radius, a map of features on the eye surface, and an estimated eye surface contour. As described above, a kappa angle between the pupillary axis (optical axis) and the foveal axis (visual axis) of the use's eye may be different for different users, and thus may need to be calibrated during the calibration. In some embodiments, the calibration may be performed by displaying a set of target points distributed over a display screen according to A certain pattern, and the user is asked to gaze at each of the target points for a certain amount of time. The camera may capture the corresponding eye positions for the target points, which are then mapped to the corresponding gaze coordinates or directions, and the eye-tracking system may then learn the mapping function or the model parameters. In some embodiments, the calibrations at block 630 and 660 may only be performed once when the near-eye display system is put on or moved.

At block 670, the gaze direction of the user's eye may be determined based on, for example, the location of the center of the pupil and the position of the center of the cornea. In some embodiments, the pupillary axis of the use's eye may be determined first and may then be used to determine the foveal axis (or line of sight, gaze direction, or visual axis) of the user's eye, for example, based on an angle between the pupillary axis and the foveal axis.

As described above, in many cases, the viewing direction may need to be determined with a high accuracy, such as less than 5°, less than 1°, or better. The peripheral location of the light sources may negatively impact the accuracy of eye tracking due to, for example, the angles of the illuminating light from the light sources to the eye. The eye-tracking system may also need to be robust in order to accommodate for extreme changes in the viewing direction and variations in facial features surrounding user's eyes, such as cases where portions of the eye, including portions of the iris or the pupil, may be obscured by, for example, eyelids or eye lashes. Obscurations may often occur when, for example, the user looks in a downward direction or when the user rapidly re-acquires the viewing direction after the eyelids reopens during eye blinks. In addition, with two or more views, a single point calibration may be sufficient for determining the gaze direction. Thus, it may also be desirable to capture multiple views of the user's eye from different perspectives.

While a larger number of light sources in the periphery of the user's field of view may help to increase the accuracy of eye tracking, increasing the number of light sources likely would cause a large amount of power consumption, which is undesirable especially for devices designed for extended use. In-field illumination may offer greater eye tracking accuracy. For example, the probability of capturing glints off the cornea over all gaze angles of the eye is higher when the light sources are located within the field of the user. However, in-field illumination may have several challenges. For example, the light sources (e.g., LEDs) in the field of view of the user may affect the see-through quality of the real world images and the displayed images. Similarly, while a larger number of cameras in the periphery of the user's field of view may provide multiple views of the eye and help to increase the accuracy and robustness of the eye tracking and reduce the calibration requirements, increasing the number of cameras would cause a higher cost and weight of the tracking system, and a large amount of power consumption, which may not be suitable for wearable devices designed for extended use.

According to certain embodiments, to overcome these problems associated with existing techniques for eye tracking, a plurality of holographic deflectors that can deflect eye-tracking light (e.g., IR light or NIR light) and refract (i.e., transmit) visible light may be formed (e.g., coated or laminated) on a transparent substrate of a near-eye display for eye illumination and imaging, where the substrate may be positioned in front of the user and within the user's field of view. The holographic deflectors may be used to deflect light from a light source to the eye and/or deflect light reflected by the eye to a camera. The holographic deflectors may deflect at least 20%, at least 50%, or at least 80% of IR light, and may have a reflectivity less than 20%, less than 5%, or less than 1% for visible light. Because visible light is allowed to pass through the holographic deflectors and the substrate with little or no loss, the holographic deflectors can be positioned in front of the user's eyes without obstructing the user's field of view, such that the user can look through the substrate and the holographic deflectors to see the outside world or the displayed content. At the same time, light (e.g., NIR light) from a light source for eye illumination can be deflected by one or more holographic deflectors to desired directions and reach the user's eye to form glints, and light reflected by the eye can be deflected by one or more holographic deflectors to a camera to form images of the eye for eye tracking. The holographic deflector may reflectively diffract light to a desired direction, rather than only specularly reflecting incident light. In some embodiments, the holographic deflectors may include reflective holographic gratings that are apodized to reduce sidelobes and other optical artifacts (e.g., rainbow effects) that may otherwise be caused by the gratings.

Figure 8:
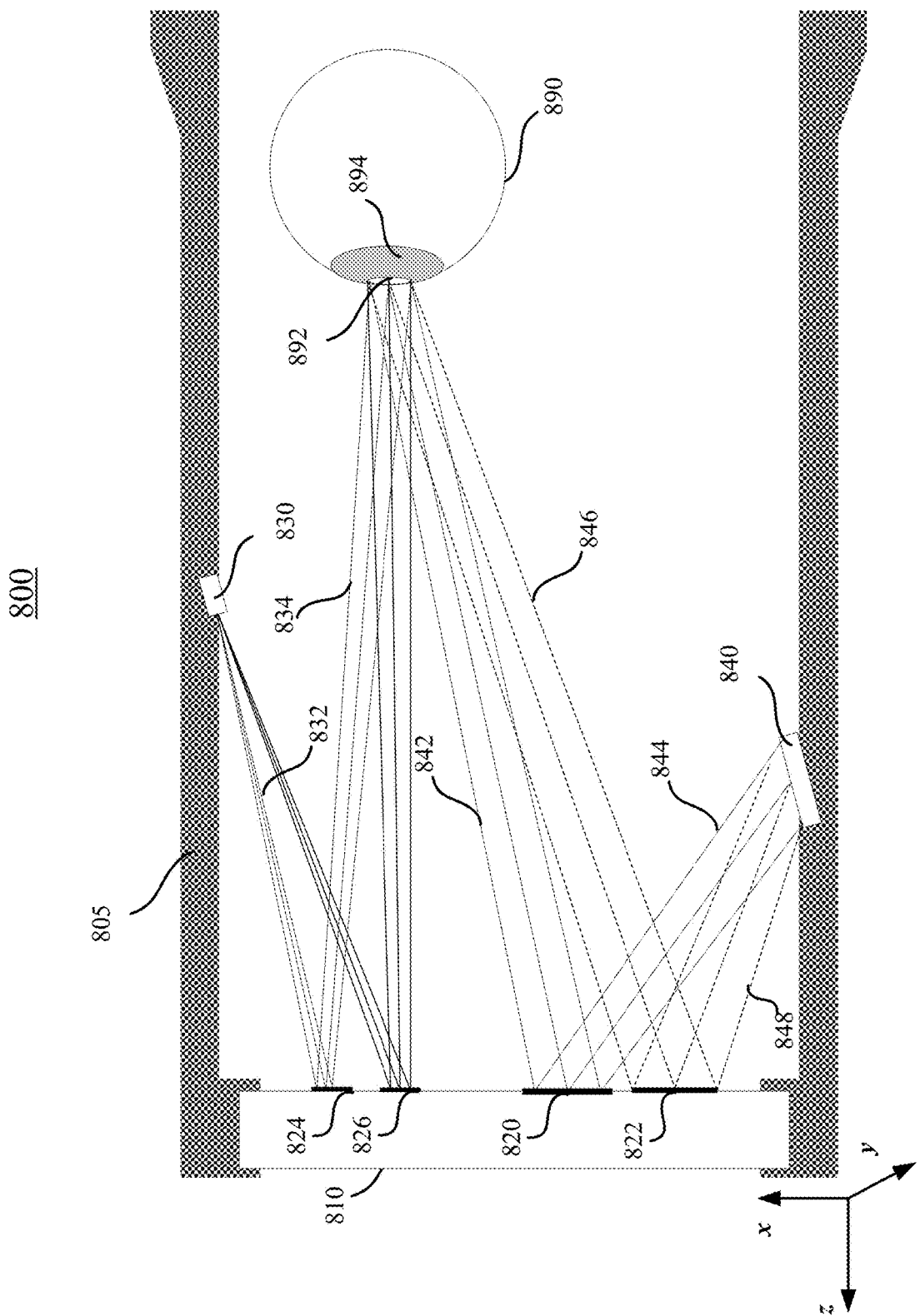
FIG. 8 is a cross-sectional view of an example of an eye-tracking system in a near-eye display system according to certain embodiments.

FIG. 8 is a cross-sectional view of an example of an eye-tracking system in a near-eye display system 800 according to certain embodiments. Near-eye display system 800 may include a frame 805 and display optics coupled to or embedded in frame 805. Frame 805 may be in the form of, for example, eyeglasses. The display optics may include a substrate 810 and one or more holographic deflectors formed on substrate 810. The eye-tracking system may include one or more light sources 830, one or more cameras 840, and one or more holographic deflectors 820, 822, 824, and 826 on substrate 810.

Substrate 810 may be similar to substrate 420 described above, and may include a flat or curved substrate that may be transparent to both invisible light (e.g., IR or NIR light) and visible light. Light source(s) 830 may be positioned in a periphery of the field of view of the user's eye, such as attached to or embedded in frame 805. Light source(s) 830 may emit light outside of visible band, such as infrared light. In some embodiments, the one or more light sources 830 may include a light emitting device (e.g., a light emitting diode (LED), a laser diode, or vertical cavity surface emitting lasers (VCSELs)) and collimating optics for collimating or otherwise modifying the light emitted by the light emitting device. Camera(s) 840 may be positioned in a periphery of the field of view of the user's eye, such as attached to or embedded in frame 805. Camera(s) 840 may be sensitive to invisible light (e.g., IR light) and may be similar to camera 514 described above.

As shown in FIG. 8, holographic deflector 824 may direct illumination light 832 from light source 830 as illumination light 834 towards user's eye 890 to illuminate user's eye 890. Holographic deflectors 824 may be conformably formed (e.g., laminated or coated) on substrate 810 and may deflect incident illumination light 832 through diffraction such that the angle of the deflected illumination light 834 may not be equal to the incident angle as in specular reflection, and thus may be designed to deflect illumination light 832 with a given incident angle to the user's eye. The illumination light may be reflected by the cornea 892, iris 894, and other parts of user's eye 890 as illumination light 842 back to substrate 810.

Illumination light 842 reflected by user's eye 890 may be reflected by one or more holographic deflectors (such as holographic deflectors 820 and 822) on substrate 810 towards the one or more cameras 840. The one or more holographic deflectors may receive different portions of illumination light reflected by the user's eye (as indicated by illumination light 842 and 846), and may deflect the different portions of illumination light reflected by the user's eye at different directions towards one or more cameras 840 (as indicated by light rays 844 and 848). Camera(s) 840 may generate one or more images of user's eye 890 from different perspectives using the different portions of illumination light deflected by the one or more holographic deflectors (as indicated by light rays 844 and 848).

As such, one or more image frames generated by camera(s) 840 may include one or more images of user's eye 890, each corresponding to a different perspective and formed at a different location on the image frame. Each image frame may also include one or more (e.g., two or more) glints on the cornea of the user's eye, where the glints may correspond to different light sources and/or different holographic deflectors (e.g., holographic deflectors 824 and 826). Based on the two or more images of the user's eye 890 and the configuration of the one or more holographic deflectors that are used to form the two or more images, the position of the user's eye 890 and the gaze direction may be determined as described above.

The holographic deflectors described above may include reflective holographic gratings recorded in a holographic material (e.g., photopolymer) layer. In some embodiments, the reflective holographic gratings can be recorded first and then laminated on the substrate (e.g., substrate 810) of the near-eye display system. In some embodiments, a holographic material layer may be coated or laminated on the substrate and the reflective holographic gratings may then be recorded in the holographic material layer. When the refractive index modulation is uniform in a holographic grating, the curve of the diffraction efficiency of the holographic grating as a function of the incident angle or the wavelength of the incident light may include high sidelobes due to the sudden change in the refractive index modulation at the interfaces between the holographic grating and other material layers.

FIG. 9A illustrates an example of a holographic deflector 900. As shown in the example, holographic deflector 900 may include a reflective holographic grating 905. Reflective holographic grating 905 may have a thickness d and may include a plurality of grating periods, where the grating fringes may be slanted such that the grating vector may not be parallel or perpendicular to the surface normal of holographic deflector 900. Reflective holographic grating 905 may have a uniform refractive index modulation within the thickness d. For example, the refractive index in reflective holographic grating 905 may change periodically, such as in the form of a sinusoidal wave. The refractive index modulation in other portions of holographic deflector 900, such as a support or cover sheet (e.g., Mylar), may be zero. Thus, there is a sudden change in refractive index modulation at the interfaces between reflective holographic grating 905 and other portions of holographic deflector 900.

FIG. 9B illustrates the refractive index n of holographic deflector 900 along a thickness direction (i.e., in z-direction along a line A-A) of holographic deflector 900. As shown, holographic deflector 900 may have a constant amplitude sinusoidal refractive index modulation within reflective holographic grating 905, and may have a constant refractive index outside of reflective holographic grating 905.

FIG. 9C illustrates the simulated transmissivity and reflectivity of a holographic deflector (e.g., holographic deflector 900) as a function of the wavelength of the incident light. The transmissivity of holographic deflector 900 may be illustrated by a curve 910, while the reflectivity of holographic deflector 900 may be illustrated by a curve 920. As shown by a portion 912 of curve 910 and a portion 922 of curve 920, holographic deflector 900 may have a high reflectivity (and thus a low transmissivity) for infrared light at around 940 nm. Theoretically, if thickness d is infinity and the refractive index is modulated by a sinusoidal function, the transmissivity and the reflectivity spectrum would show a single high reflectivity wavelength based on Fourier transform. However, due to the rectangular windowing of the refractive index modulation in holographic deflector 900 and, in some cases, the non-sinusoidal refractive index modulation of the grating fringes, curve 910 and curve 920 may also include some relatively high sidelobes 914 and 924 (sometimes referred to as spectral leakage). In some cases, as shown by a portion 916 of curve 910 and a portion 926 of curve 920, holographic deflector 900 may also have a relatively high reflectivity for visible light, such as blue light at around 470 nm (which is about one half of the maximum reflectivity wavelength 940 nm) as shown in FIG. 9C caused by, for example, higher order diffractions.

Although not shown in the figures, the transmissivity and reflectivity curves of a holographic deflector (e.g., holographic deflector 900) as a function of the incident angle may also have relatively high sidelobes. In addition, for other gratings used in the near-eye display system, such as input coupler 430 and output couplers 440 shown in FIG. 4, the diffraction efficiency curve with respect to the wavelength or incident angle may similarly show significant sidelobes and/or diffractions of other orders.

The sidelobes and other undesired diffractions in the visible band and/or IR band caused by the diffractive gratings may cause some optical artifacts, such as ghost images and blurring in the user visible images and/or glint blurring in the capture images for eye tracking. For example, external light from an external light source (e.g., the sun or a lamp) and in a certain visible wavelength range may also be diffracted by the holographic deflectors to reach user's eye. In addition, due to the chromatic dispersion of gratings, lights of different colors may be diffracted at different angles for diffractions with a diffraction order greater or less than zero. As such, the diffractions of external light of different colors that reach the user's eye may appear as ghost images located at different locations (or directions), which may be referred to as a rainbow artifact or rainbow ghost. The rainbow ghost may appear on top of the displayed image or the image of the environment, and disrupt the displayed image or the image of the environment. The rainbow ghost may significantly impact the user experience.

Figure 10:
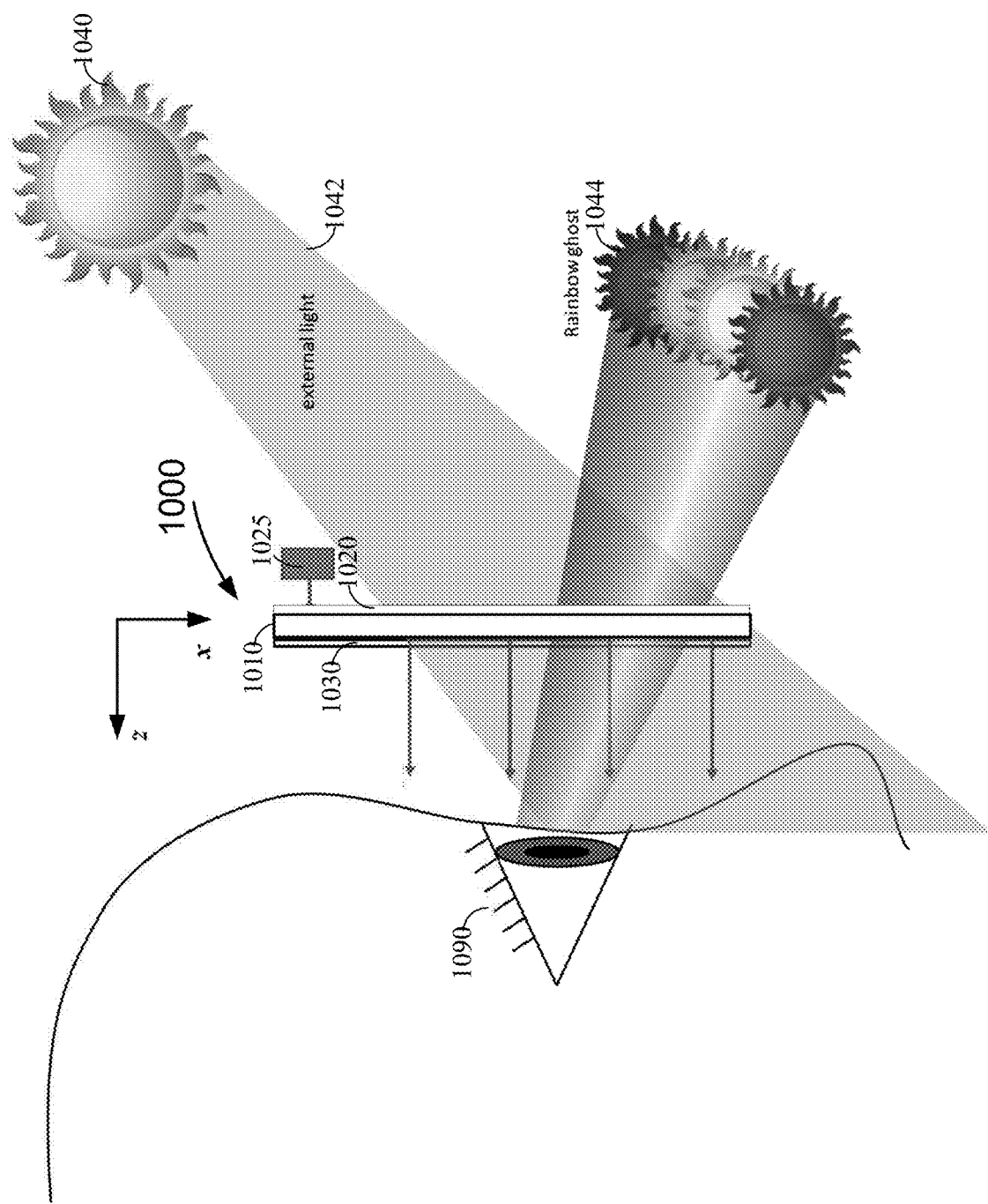
FIG. 10 illustrates examples of optical artifacts in an example of a waveguide display.

FIG. 10 illustrates rainbow artifacts in an example of a waveguide display 1000. As described above, waveguide display 1000 may include a waveguide 1010, a grating coupler 1020 (e.g., output coupler 440), a projector 1005, and an IR light deflector 1030 (e.g., holographic deflector 820, 822, 824, or 826). Display light from projector 1005 may be coupled into waveguide 1010, and may be partially coupled out of waveguide 1010 at different locations by grating coupler 1020 to reach a user's eye 1090. IR light deflector 1030 may include a reflective holographic grating and may be used to reflect eye-tracking light from a light source (not shown in FIG. 10) to user's eye 1090 or reflect eye-tracking light reflected by user's eye 1090 to a camera (not shown in FIG. 10). Grating coupler 1020 and IR light deflector 1030 may be on a same side of waveguide 1010 or on opposite sides of waveguide 1010.

External light 1042 from an external light source 1040, such as the sun or a lamp, may pass through waveguide 1010 to reach user's eye 1090. As described above, grating coupler 1020 and IR light deflector 1030 may also diffract the external light. In addition, due to the chromatic dispersion of the grating, lights of different colors may be diffracted at different angles for diffractions with a diffraction order greater or less than zero. As such, the diffractions of external light of different colors may reach the user's eye and may appear as ghost images located at different locations (or directions), which may be referred to as a rainbow artifact or rainbow ghost 1044. Rainbow ghost 1044 may appear on top of the displayed image or the image of the environment, and disrupt the displayed image or the image of the environment. Rainbow ghost 1044 may significantly impact the user experience. In some cases, rainbow ghost 1044 may also be dangerous to user's eye 1090 when the light from external light source 1040 (e.g., the sun) is directed to user's eye 1090 with a high efficiency.

Techniques disclosed herein may be used to reduce the rainbow ghost caused by the diffraction of external light by gratings in a waveguide display. According to certain embodiments, in order to reduce the optical artifacts caused by the gratings, such as the grating couplers and the holographic deflectors, an apodization function (or windowing or tapering function) may be applied to the grating (e.g., reflective holographic grating 905 or output coupler 440) to avoid the sudden change in the refractive index modulation in the gratings. The apodization function may have a bell-shaped curve, such as a sine or cosine function, Gaussian function, Hann function, Blackman function, Nuttall function, Blackman-Harris function, and the like. The apodization function may cause a gradual change of the refractive index modulation from a maximum value at the center of the grating to zero at the surfaces of the grating, which may reduce the sidelobes in the diffraction spectrum and thus the optical artifacts, such as the ghost images.

FIG. 11A illustrates an example of a holographic deflector 1100 including an apodized reflective holographic grating 1105 according to certain embodiments. Reflective holographic grating 1105 may have a thickness d and may include a plurality of grating periods, where the grating fringes may be slanted such that the grating vector may not be parallel or perpendicular to the surface normal of holographic deflector 1100. Within each grating period, the refractive index of reflective holographic grating 1105 may be approximately a sinusoidal function. Reflective holographic grating 1105 may have a varying refractive index modulation within the thickness d. For example, the refractive index modulation may be the highest in the middle of reflective holographic grating 1105, and may gradually decrease to zero at the edges of reflective holographic grating 1105 or surfaces of holographic deflector 1100.

FIG. 11B illustrates the refractive index n of holographic deflector 1100 along a thickness direction (i.e., in z-direction along a line A-A) of holographic deflector 1100. As shown by a refractive index curve 1150 in FIG. 11B, holographic deflector 1100 may have a varying amplitude sinusoidal refractive index modulation within reflective holographic grating 1105, and may have a constant refractive index outside of reflective holographic grating 1105. The amplitude of the sinusoidal refractive index modulation in the z-direction may be shown by a bell-shaped curve 1160.

FIG. 11C illustrates the transmissivity and reflectivity curves of a holographic deflector (e.g., holographic deflector 1100) as a function of the wavelength of the incident light. The transmissivity of holographic deflector 1100 may be illustrated by a curve 1110, while the reflectivity of holographic deflector 1100 may be illustrated by a curve 1120. As shown by a portion 1112 of curve 1110 and a portion 1122 of curve 1120, holographic deflector 1100 may have a high reflectivity (and thus a low transmissivity) for infrared light at around 940 nm.

Compared with curve 910 and curve 920, curve 1110 and curve 1120 may have much lower sidelobes. In addition, as shown by a portion 1114 of curve 1110 and a portion 1124 of curve 1120, holographic deflector 1100 may also have a lower reflectivity for visible light, such as blue light at around 470 nm as shown in FIG. 11C. As such, optical artifacts caused by holographic deflector 1100 may be reduced significantly.

In general, to record a holographic grating, two coherent beams may interfere with each other at certain angles to generate a unique interference pattern in a photosensitive material layer, which may in turn generate a unique refractive index modulation pattern in the photosensitive material layer, where the refractive index modulation pattern may correspond to the light intensity pattern of the interference pattern. In one example, the photosensitive material layer may include polymeric binders, monomers (e.g., acrylic monomers), and initiating agents, such as initiators, chain transfer agents, or photosensitizing dyes. The polymeric binders may act as the support matrix. The monomers may serve as refractive index modulators. The photosensitizing dyes may absorb light and interact with the initiators to polymerize the monomers. Therefore, the interference pattern may cause the polymerization and diffusion of the monomers to bright fringes, thus generating polymerization concentration and density gradients that may result in refractive index modulation. For example, areas with a higher concentration of polymerization may have a higher refractive index. As the exposure and polymerization proceed, fewer monomers may be available for polymerization, and the diffusion may be suppressed. After all or substantially all monomers have been polymerized, no more new gratings may be recorded in the photosensitive material layer. In some embodiments, the recorded holographic grating on the photosensitive material layer may be UV cured or thermally cured or enhanced, for example, for dye bleaching, completing polymerization, permanently fixing the recorded pattern, and enhancing the refractive index modulation. At the end of the process, a hologram or holographic grating may be formed. The holographic grating can be a volume Bragg grating with a thickness of, such as, for example, a few, or tens, or hundreds of microns. There may be very few holographic recording materials that are sensitive to infrared light. As such, to record a holographic grating that can reflectively diffract infrared light, recording light at a shorter wavelength may be used.

Figure 12:
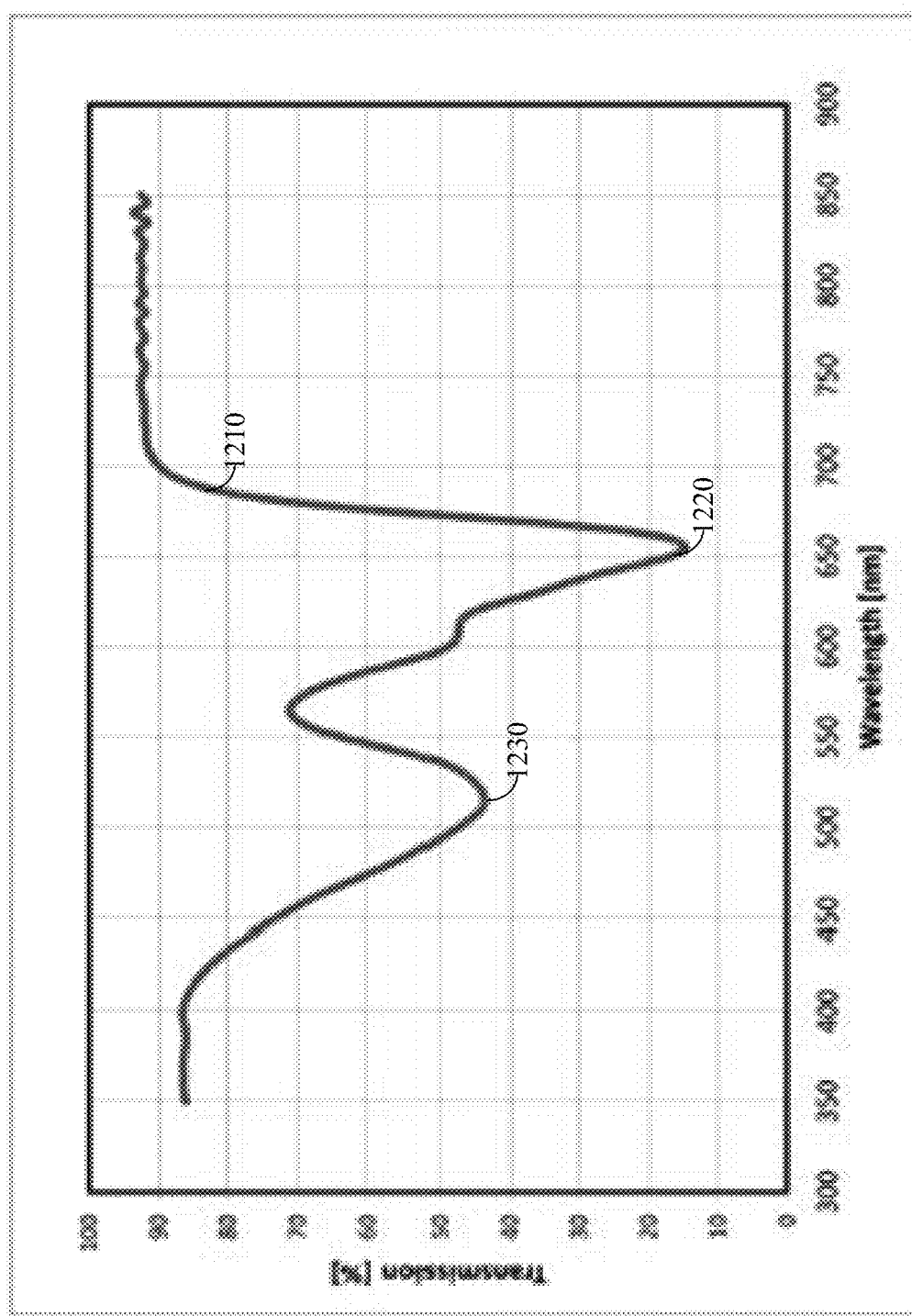
FIG. 12 illustrates the absorption spectrum of an example of a holographic recording material according to certain embodiments.

FIG. 12 illustrates the absorption spectrum 1210 of an example of a holographic recording material according to certain embodiments. As shown in the example, the holographic recording material may have a very low absorption for light with a wavelength longer than 700 nm or shorter than 440 nm. The holographic recording material may have a peak light absorption at 660 nm as shown by the minimum transmission point 1220. The holographic recording material may also have a local minimum transmission point 1230 (i.e., local maximum absorption point) at about 515 nm. As such, holographic gratings may be recorded in the holographic recording material using coherent light beams with a wavelength between about 440 nm and about 670 nm, such as at about 660 nm or about 515 nm.

Figure 13B:
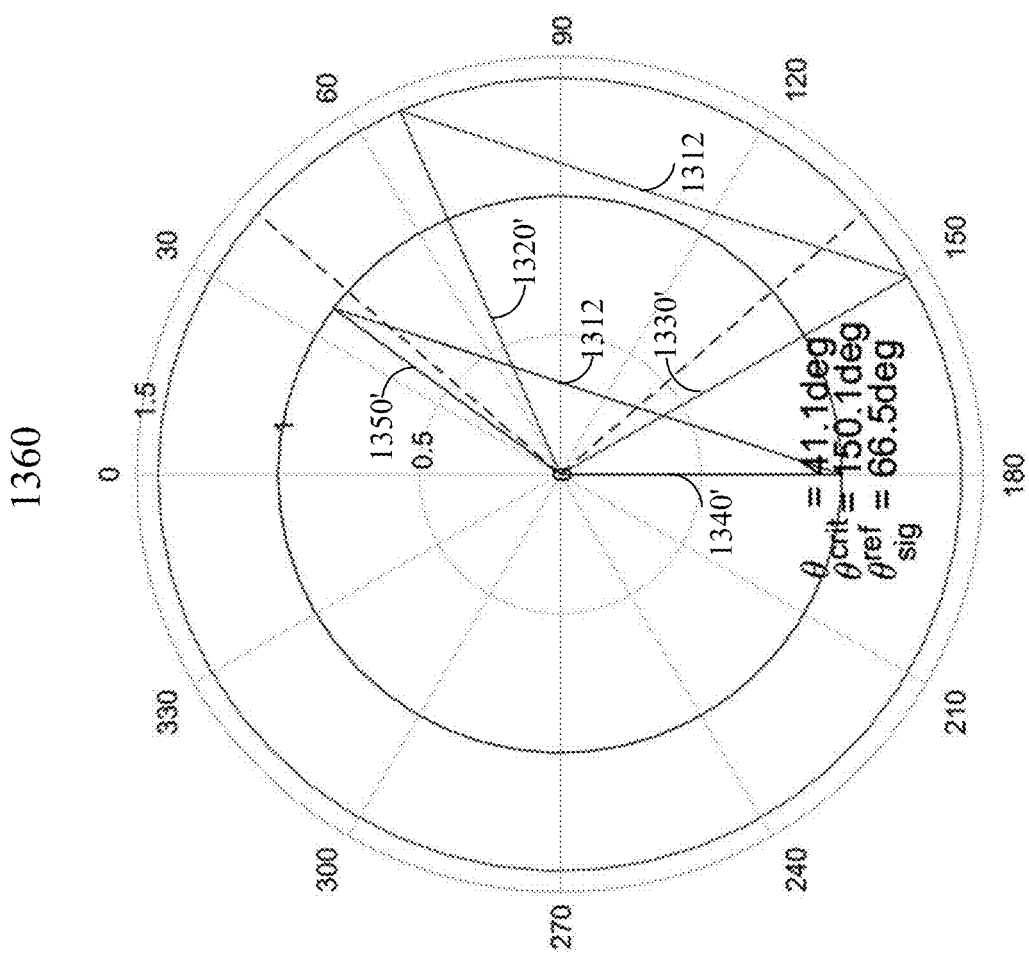
FIG. 13B is an example of a holography momentum diagram illustrating the wave vectors of recording beams and reconstruction beams and the grating vector of the recorded reflective holographic grating according to certain embodiments.
Figure 13A:
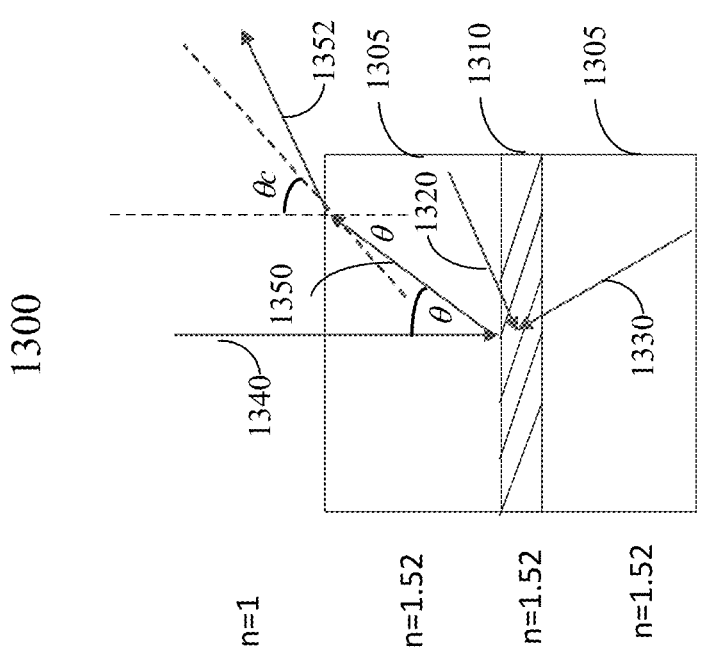
FIG. 13A illustrates the recording and reconstruction light beams for a reflective holographic grating according to certain embodiments.

FIG. 13A illustrates the recording (or construction) and reconstruction light beams for an example of a reflective holographic grating according to certain embodiments. In the example illustrated, a holographic deflector 1300 may include a holographic material layer 1310 attached to one or two support layers 1305, which may each include a glass or a plastic material. Holographic material layer 1310 and support layers 1305 may have similar refractive index, such as about 1.52. A reflective holographic grating may be recorded in holographic material layer 1310 using coherent recording beams 1320 and 1330 at a first wavelength, such as 660 nm. When a light beam 1340 at a second wavelength (e.g., 940 nm) is incident on the holographic deflector at a 0° incident angle, light beam 1340 may be deflected (e.g., reflectively diffracted) by the reflective holographic grating as shown by a deflected light beam 1350. If the diffraction angle θ of deflected light beam 1350 is less than a critical angle θc, deflected light beam 1350 may be refracted out of holographic deflector 1300 as shown by a light beam 1352.

FIG. 13B is an example of a holography momentum diagram illustrating the Bragg degeneracy for the reflective holographic grating shown in FIG. 13A according to certain embodiments. FIG. 13B shows the Bragg matching conditions during the holographic grating recording and reconstruction. The length of wave vectors 1320' and 1330' of recording beams 1320 and 1330 may be determined based on the recording light wavelength Λ, according to $2\pi n/\lambda_c$, where n is the average refractive index of holographic material layer 1310. The directions of wave vectors 1320' and 1330' of recording beams 1320 and 1330 may be determined based on the desired grating vector K (1212) such that wave vectors 1320' and 1330' and grating vector K can form an isosceles triangle as shown in FIG. 13B. Grating vector K may have an amplitude $2\pi/\Lambda$, where Λ is the grating period. Grating vector K may in turn be determined based on the desired reconstruction condition. For example, based on the desired reconstruction wavelength $\lambda_r$ and the directions of the incident light beam and the diffracted light beam, grating vector K (1212) of the reflective holographic grating may be determined based on the Bragg condition, where wave vector 1340' of incident light beam 1340 and wave vector 1350' of diffracted light beam 1350 may have an amplitude $2\pi n/\lambda_r$, and may form an isosceles triangle with grating vector K (1212) as shown in FIG. 13B.

For a given wavelength, there may only be one pair of incident angle and diffraction angle that meet the Bragg condition perfectly. Similarly, for a given incident angle, there may only be one wavelength that meets the Bragg condition perfectly. When the incident angle of the reconstruction light beam is different from the incident angle that meets the Bragg condition of the reflective holographic grating or when the wavelength of the reconstruction light beam is different from the wavelength that meets the Bragg condition of the reflective holographic grating, the diffraction efficiency may be reduced as a function of the Bragg mismatch factor caused by the angular or wavelength detuning from the Bragg condition. As such, the diffraction may only occur in a small wavelength range and a small incident angle range.

Figure 14B:
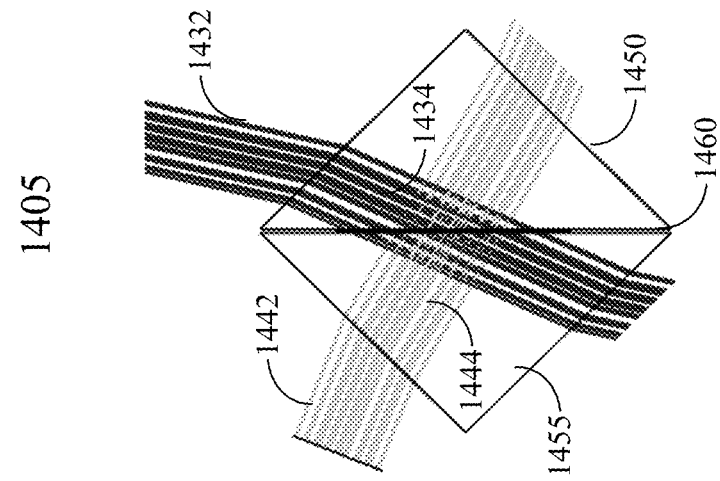
FIG. 14B illustrates the interference of two recording beams in the holographic recording material according to certain embodiments.
Figure 14A:
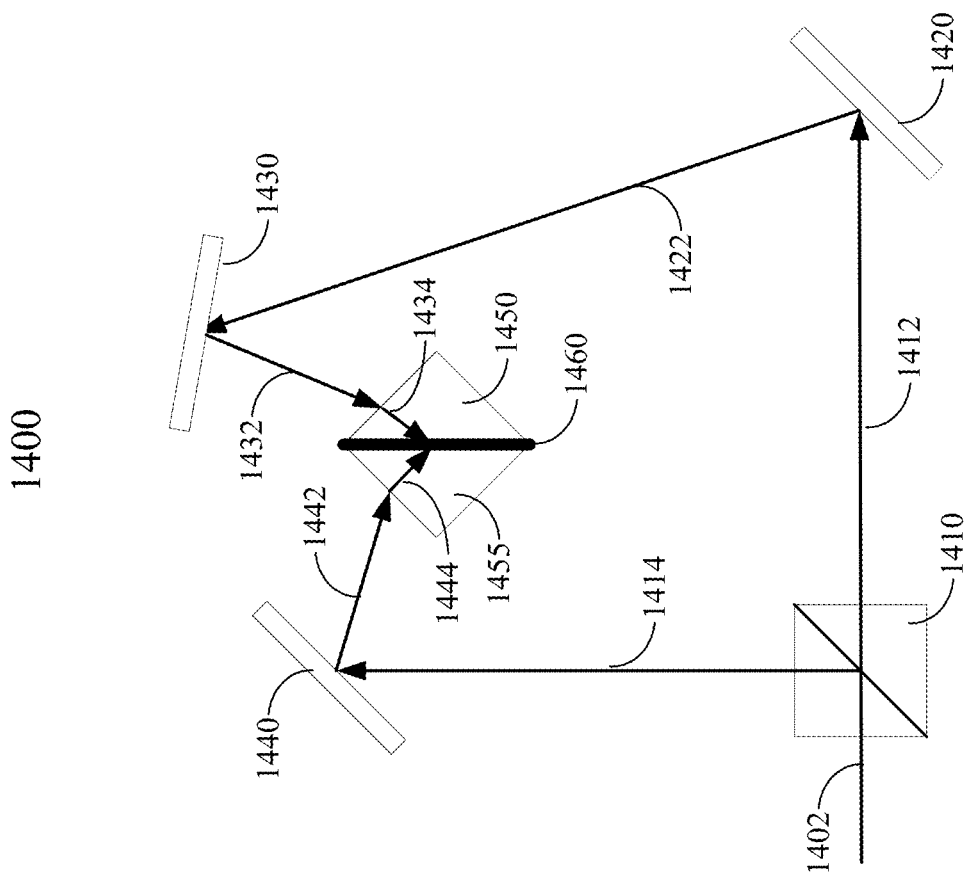
FIG. 14A illustrates an example of a holographic recording system for recording reflective holographic gratings according to certain embodiments.

FIG. 14A illustrates an example of a holographic recording system 1400 for recording reflective holographic gratings according to certain embodiments. Holographic recording system 1400 includes a beam splitter 1410 (e.g., a beam splitter cube), which may split an incident laser beam 1402 into two light beams 1412 and 1414 that are coherent and may have similar intensities. Light beam 1412 may be reflected by a first mirror 1420 towards a second mirror 1430 as shown by the reflected beam 1422. Reflected beam 1422 may then be reflected by second mirror 1430 towards a first triangle prism 1450, where the reflected beam 1432 may be refracted by first triangle prism 1450 (as shown by a recording beam 1434) and reach a holographic recording material 1460. On another path, light beam 1414 may be reflected by a third mirror 1440. The reflected beam 1442 may be directed towards a second triangle prism 1455, and may be refracted by second triangle prism 1455 (as shown by a recording beam 1444) to reach holographic recording material 1460. First triangle prism 1450 and second triangle prism 1455 may be used for refractive index matching. The mirrors, first triangle prism 1450, and/or second triangle prism 1455 may be configured such that the incident angle of at least one of the recording light beams can be beyond a critical angle and can be totally reflected if the prisms are not used. Recording beam 1434 and recording beam 1444 may interfere with each other within holographic recording material 1460 to form an interference pattern and thus a holographic grating in holographic recording material 1460.

FIG. 14B illustrates the interference of two recording beams 1434 and 1444 in holographic recording material 1460 according to certain embodiments. As described above, reflected beam 1432 from second mirror 1430 and reflected beam 1442 from third mirror 1440 may be refracted into first triangle prism 1450 and second triangle prism 1455 as recording beams 1434 and 1444. The two recording beams 1434 and 1444 may be incident on holographic recording material 1460 and may interfere with each other in holographic recording material 1460. First triangle prism 1450 and second triangle prism 1455 may each have a refractive index close to the refractive index of holographic recording material 1460, and may be used to change the large incident angles of the recording beam at holographic recording material 1460 to relatively small incident angles at the prisms. Thus, recording beam 1434 or 1444 may not be totally reflected at the interface between holographic recording material 1460 and other media, such as air. In some embodiments, some surfaces of prisms may be coated with a light absorption material to reduce stray light and/or light reflection at these surfaces.

As described above, in order to reduce the optical artifacts caused by the holographic deflectors, the reflective holographic grating may be apodized before or after the holographic recording. According to some embodiments, the holographic recording and apodization may be performed in a same process using the recording beams. In some embodiments, the holographic recording and apodization may be performed in two separate processes, where the holographic recording material may be pre-conditioned using coherent or incoherent light before the holographic recording or may be post-exposed using coherent or incoherent light after the holographic recording.

FIG. 15A illustrates an example of a method for apodizing a holographic grating using the recording beams according to certain embodiments. As illustrated, a holographic recording material layer 1500 may be exposed to recording beams 1510 and 1520 that are incident on holographic recording material layer 1500 from opposite sides. Holographic recording material layer 1500 may include a photopolymer that is sensitive to light of certain wavelengths, such as from about 440 nm to about 670 nm as shown in FIG. 12. The photopolymer may have a low contrast and a linear or nonlinear response to exposure dose. The photopolymer may self-develop after absorbing the recording light. The wavelength and the incident angle of recording beams 1510 and 1520 may be selected as described above with respect to, for example, FIGS. 13A and 13B, such that a holographic grating with a desired grating vector may be achieved by the interference of recording beams 1510 and 1520.

Due to the light absorption of the holographic recording material, the intensities of the recording light at different depths (in z-direction or the thickness direction) in the holographic recording material may be different. For example, the light intensity of recording beam 1510 within holographic recording material layer 1500 may be shown by a curve 1512 and may be configured such that the light intensity of recording beam 1510 may decrease as recording beam 1510 propagates within holographic recording material layer 1500 and is absorbed by the holographic recording material. Similarly, the light intensity of recording beam 1520 within holographic recording material layer 1500 may be shown by a curve 1522 and may be configured such that the light intensity of recording beam 1520 may decrease as recording beam 1520 propagates within holographic recording material layer 1500 and is absorbed by the holographic recording material. Because recording beam 1510 and recording beam 1520 propagate in the opposite directions, the intensity variation in the interference pattern of the two recording beams may be the largest near the center of holographic recording material layer 1500 where the intensities of recording beams 1510 and 1520 may be approximately equal. Thus, the refractive index modulation near the center of holographic recording material layer 1500 may be high. Near edges 1502 and 1504 of holographic recording material layer 1500, one recording beam may have a higher intensity than the other recording beam, and thus the intensity variation in the interference pattern of the two recording beams may be small. Therefore, the refractive index modulation near edges 1502 and 1504 of holographic recording material layer 1500 may be small. As a result, the holographic grating formed in holographic recording material layer 1500 may be apodized in the z-direction.

In some implementations, the initiating agents (e.g., photoinitiators) in holographic recording material layer 1500, such as the photosensitizing dyes and initiators, may not have the desired light absorption characteristics for the recording light (e.g., between about 440 nm and about 670 nm, such as at 660 nm) in order to achieve the desired intensity profiles of the recording light in holographic recording material layer 1500. According to some embodiments, some amounts (e.g., according to certain concentration ratios) of light absorption materials that can absorb the recording light but may not initiate the polymerization of the monomers may be added to the holographic recording material to tune the absorption characteristics of holographic recording material layer 1500, such that holographic recording material layer 1500 may have the desired overall light absorption characteristics to achieve the desired intensity profiles of the recording light. For example, as shown in FIG. 15A, one or more light absorption materials may be added to the holographic recording material to increase the absorption of the recording light by holographic recording material layer 1500. As such, the light intensity of recording beam 1510 within holographic recording material layer 1500 may be shown by a curve 1514 that is lower than curve 1512 that represents the light intensity of recording beam 1510 within holographic recording material layer 1500 without the additional light absorption materials. Similarly, the light intensity of recording beam 1520 within holographic recording material layer 1500 may be shown by a curve 1524 that is lower than curve 1522 that represents the light intensity of recording beam 1520 within holographic recording material layer 1500 without the additional light absorption materials.

FIG. 15B illustrates an example of an apodized holographic grating 1550 fabricated using the method described in FIG. 15A according to certain embodiments. As shown in the example, apodized holographic grating 1550 may have a higher refractive index modulation at the center of apodized holographic grating 1550. The refractive index modulation at the edges 1552 and 1554 of apodized holographic grating 1550 can be very low or close to zero, depending on, for example, the intensities of incident recording beams, the absorption rate of the holographic recording material, and the thickness of the holographic recording material layer. Thus, the apodization profile of apodized holographic grating 1550 may depend on, for example, the intensities of incident recording beams, the absorption rate of the holographic recording material, and the thickness of the holographic recording material layer.

FIG. 15C illustrates the refractive index of apodized holographic grating 1550 along a thickness direction (i.e., the z-direction) of apodized holographic grating 1550 according to certain embodiments. As in FIG. 11B, a refractive index 1560 of apodized holographic grating 1550 may have a varying amplitude sinusoidal refractive index modulation in the middle of reflective holographic grating 1105, and may have a constant refractive index near edges 1552 and 1554 of apodized holographic grating 1550. The amplitude of the sinusoidal refractive index modulation in the z-direction may be shown by a bell-shaped curve 1570.

Figures 16A, 16B, 16C:
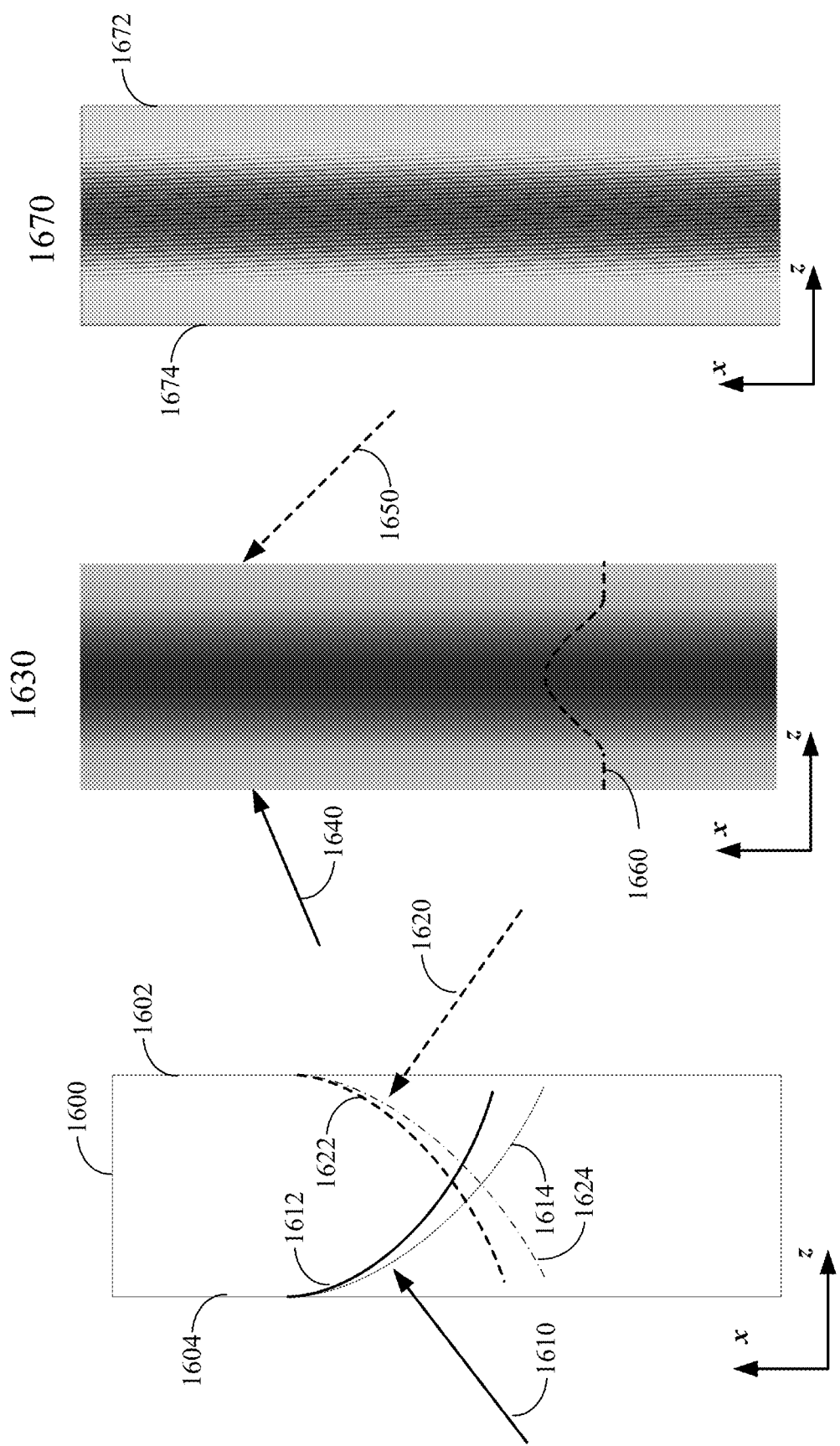
FIGS. 16A-16C illustrates an example of a method for recording an apodized holographic grating where the holographic recording material is desensitized using coherent or incoherent light according to certain embodiments.

FIGS. 16A-16C illustrates another example of a method for recording an apodized holographic grating where the holographic recording material is desensitized using coherent or incoherent light according to certain embodiments. FIG. 16A illustrates an example of a method of desensitizing a holographic recording material using incoherent light prior to the holographic recording according to certain embodiments. As illustrated, a holographic recording material layer 1600 may be exposed to one or more incoherent desensitizing light beams 1610 and 1620 that are incident on holographic recording material layer 1600 from opposite sides. Holographic recording material layer 1600 may include a photopolymer that is sensitive to light of certain wavelengths, such as from about 440 nm to about 670 nm as shown in FIG. 12. Light beams 1610 and 1620 may have a same wavelength or different wavelengths within the absorption bandwidth of the holographic recording material. The photopolymer may have a low contrast and a linear or nonlinear response to exposure dose. The photopolymer may self-develop after absorbing the recording light.

Due to the light absorption of the holographic recording material, the intensities of light beams 1610 and 1620 at different depths (in the z-direction or the thickness direction) in the holographic recording material may be different. For example, the light intensity of light beam 1610 within holographic recording material layer 1600 may be shown by a curve 1612 and may decrease as light beam 1610 propagates within holographic recording material layer 1600 and is absorbed by the holographic recording material. Similarly, the light intensity of light beam 1620 within holographic recording material layer 1600 may be shown by a curve 1622 and may decrease as light beam 1620 propagates within holographic recording material layer 1600 and is absorbed by the holographic recording material. Because light beams 1610 and 1620 are incoherent, they may not interfere to form an interference pattern within holographic recording material layer 1600, and thus no grating structure may be formed in holographic recording material layer 1600 by light beams 1610 and 1620. However, photosensitizing dyes in the holographic recording material may absorb light beams 1610 and 1620 and interact with the initiators to polymerize the monomers. Thus, at edges 1602 and 1604 of holographic recording material layer 1600 where the intensity of the light beam is high, most or all monomers may be polymerized such that fewer monomers may be available for further polymerization. At about the center of holographic recording material layer 1600, more monomers may still be available for further polymerization because the relative low intensity of light beam 1610 or 1620. As a result, the sensitivity profile of holographic recording material layer 1600 may be apodized.

In some embodiments, holographic recording material layer 1600 may also be desensitized by exposing to one or more coherent light beams that may be different from the recording light beams, such as having different wavelengths from the recording light beams. For example, the intensities of the coherent light beams may be selected such that the light beams may be absorbed before they reach the center of holographic recording material layer 1600.

In some embodiments, holographic recording material layer 1600 may include multiple layers of different materials, such as materials with different compositions, different sensitivities, and/or different maximum achievable refractive index modulation. For example, holographic recording material layer 1600 may be formed by depositing thin layers of photosensitive materials with different maximum achievable refractive index modulation, such that the maximum achievable refractive index modulation in holographic recording material layer 1600 may be a bell-shaped function in the z-direction of holographic recording material layer 1600.

As described above, in some implementations, the initiating agents (e.g., photoinitiators) in holographic recording material layer 1600, such as the photosensitizing dyes and initiators, may not have the desired light absorption characteristics for the desensitizing light beam (e.g., between about 440 nm and about 670 nm, such as at 660 nm) in order to achieve the desired intensity profiles of the desensitizing light in holographic recording material layer 1600. According to some embodiments, some amounts (e.g., according to certain concentration ratios) of light absorption materials that can absorb the desensitizing light but may not initiate the polymerization of the monomers may be added to the holographic recording material to tune the absorption characteristics of holographic recording material layer 1600, such that holographic recording material layer 1600 may have the desired overall light absorption characteristics to achieve the desired intensity profiles of the desensitizing light. For example, as shown in FIG. 16A, one or more light absorption materials may be added to the holographic recording material to increase the absorption of the desensitizing light by holographic recording material layer 1600. As such, the light intensity of desensitizing light beam 1610 within holographic recording material layer 1600 may be shown by a curve 1614 that is lower than curve 1612 that represents the light intensity of desensitizing light beam 1610 within holographic recording material layer 1600 without the additional light absorption materials. Similarly, the light intensity of desensitizing light beam 1620 within holographic recording material layer 1600 may be shown by a curve 1624 that is lower than curve 1622 that represents the light intensity of desensitizing light beam 1620 within holographic recording material layer 1600 without the additional light absorption materials.

FIG. 16B illustrates an example of an method of recording an apodized holographic grating in a desensitized holographic recording material layer 1630 according to certain embodiments. Desensitized holographic recording material layer 1630 may be made as described above with respect to FIG. 16A, and may have an apodized sensitivity profile (or maximum achievable refractive index modulation profile) shown by a curve 1660. Coherent recording beams 1640 and 1650 may be incident on desensitized holographic recording material layer 1630. The wavelength and the incident angles of coherent recording beams 1640 and 1650 may be selected as described above with respect to, for example, FIGS. 13A and 13B, such that a holographic grating with a desired grating vector may be achieved by the interference of coherent recording beams 1640 and 1650. In some embodiments, coherent recording beams 1640 and 1650 may have a high intensity such that the loss due to absorption by the holographic recording material is negligible and the intensity remains approximately constant within the desensitized holographic recording material layer 1630.

FIG. 16C illustrates an example of an apodized holographic grating 1670 fabricated using the method described with respect to FIGS. 16A and 16B according to certain embodiments. Apodized holographic grating 1670 may be fabricated by the desensitization process shown in FIG. 16A and the holographic recording process shown in FIG. 16B. As apodized holographic grating 1550, apodized holographic grating 1670 have a higher refractive index modulation at the center. The refractive index modulation at edges 1672 and 1674 of apodized holographic grating 1670 can be very low or close to zero.

In some embodiments, the apodized holographic grating may be fabricated by recording a holographic grating first and then curing the holographic grating using coherent or incoherent light to polymerize all monomers, where the holographic grating may be apodized during the curing.

In some embodiments, the photosensitive or light absorption materials in the holographic recording materials, such as the photosensitizing dyes and other light absorption materials described above, may be deactivated, converted, or removed to desensitize the holographic recording materials after the holographic optical element is recorded. For example, in some embodiments, the photosensitizing dyes (e.g., red light absorption dyes) may be removed by solvent extraction, thermal decomposition, chemical reaction (e.g., with oxidizing agents), photo bleaching using UV light, or any combination thereof, with or without the presence of oxygen.

Figure 17:
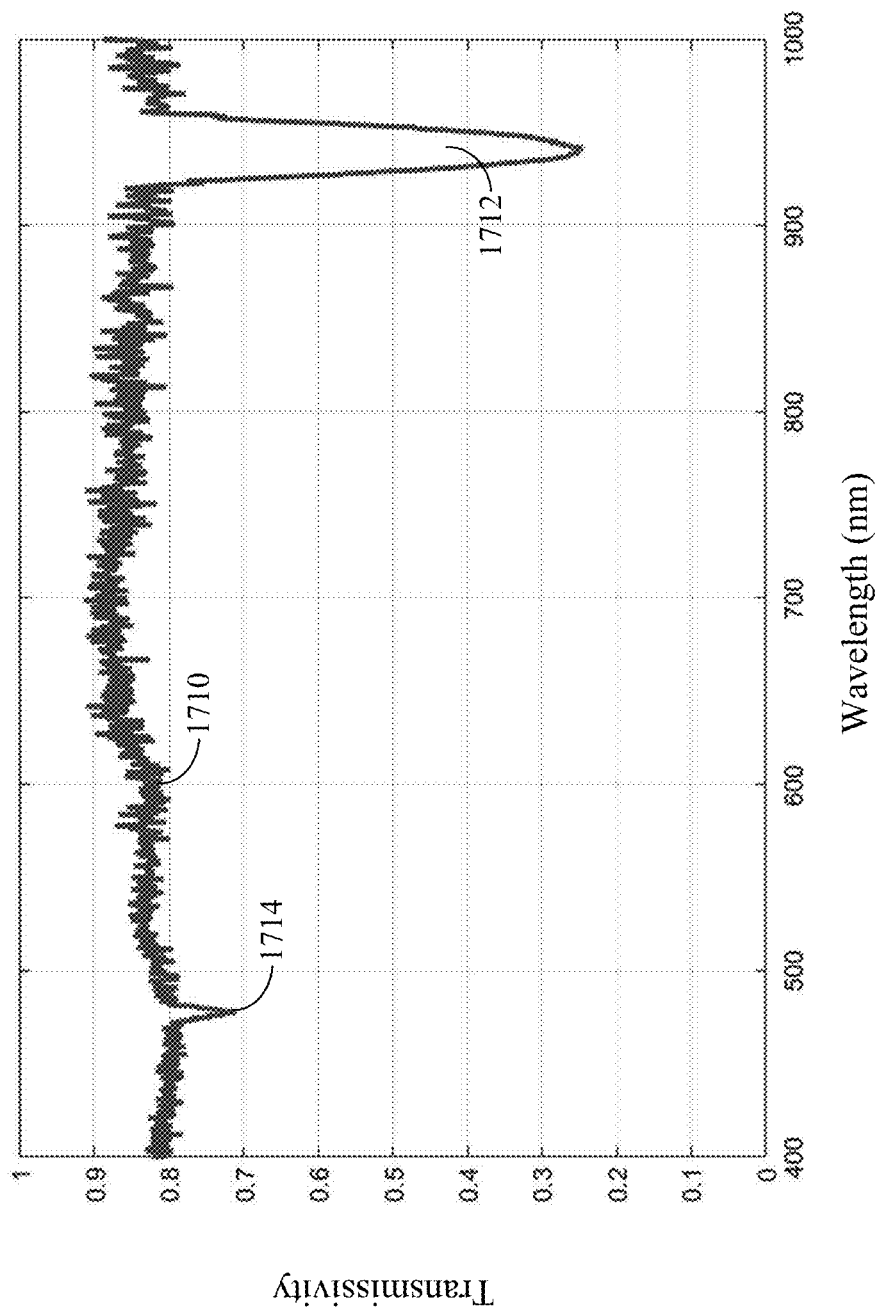
FIG. 17 illustrates the transmission spectrum of an example of a reflective holographic grating according to certain embodiments.

FIG. 17 illustrates the transmission spectrum 1710 of an example of an apodized reflective holographic grating according to certain embodiments. The apodized reflective holographic grating may be fabricated as described above. The Bragg condition for the apodized reflective holographic grating may be met for infrared light at about 940 nm, and thus may have a low transmissivity within a wavelength range 1712 centered around 940 nm. The infrared light may be emitted by a light source (e.g., a VCSEL or an LED) and may be used for eye illumination during eye tracking. As shown by the in FIG. 17, the sidelobes around 940 nm and the reflectivity in visible light range (e.g., in a wavelength range 1714, such as around 470 nm, which is about one half of the wavelength for the Bragg condition) are much lower than these shown in FIG. 9B.

Figures 18A, 18B:
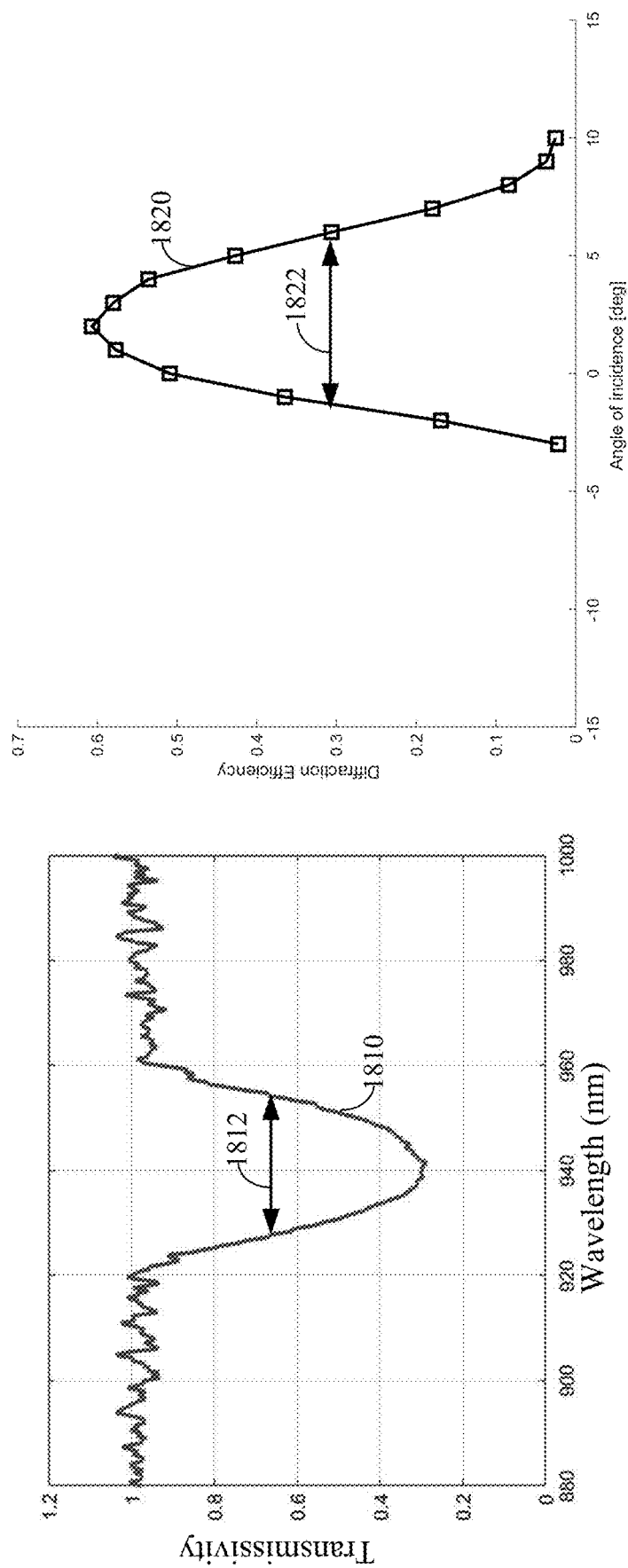
FIG. 18A illustrates the spectral bandwidth of an example of a reflective holographic grating according to certain embodiments.
FIG. 18B illustrates the angular bandwidth of the example of the reflective holographic grating according to certain embodiments.

FIG. 18A illustrates the spectral bandwidth of an example of a reflective holographic grating according to certain embodiments. The reflective holographic grating may be apodized as described above and the transmissivity spectrum may be shown by a curve 1810. The reflective holographic grating may have a maximum diffraction efficiency at 940 nm, and a full-width half-magnitude bandwidth about 25 nm.

FIG. 18B illustrates the angular bandwidth of the example of reflective holographic grating of FIG. 18A according to certain embodiments. The diffraction efficiency of the reflective holographic grating as a function of the incident angle is shown by a curve 1820. Curve 1820 shows that the full-width half-magnitude range of the incident angle is about 7.5°.

Figure 19A:
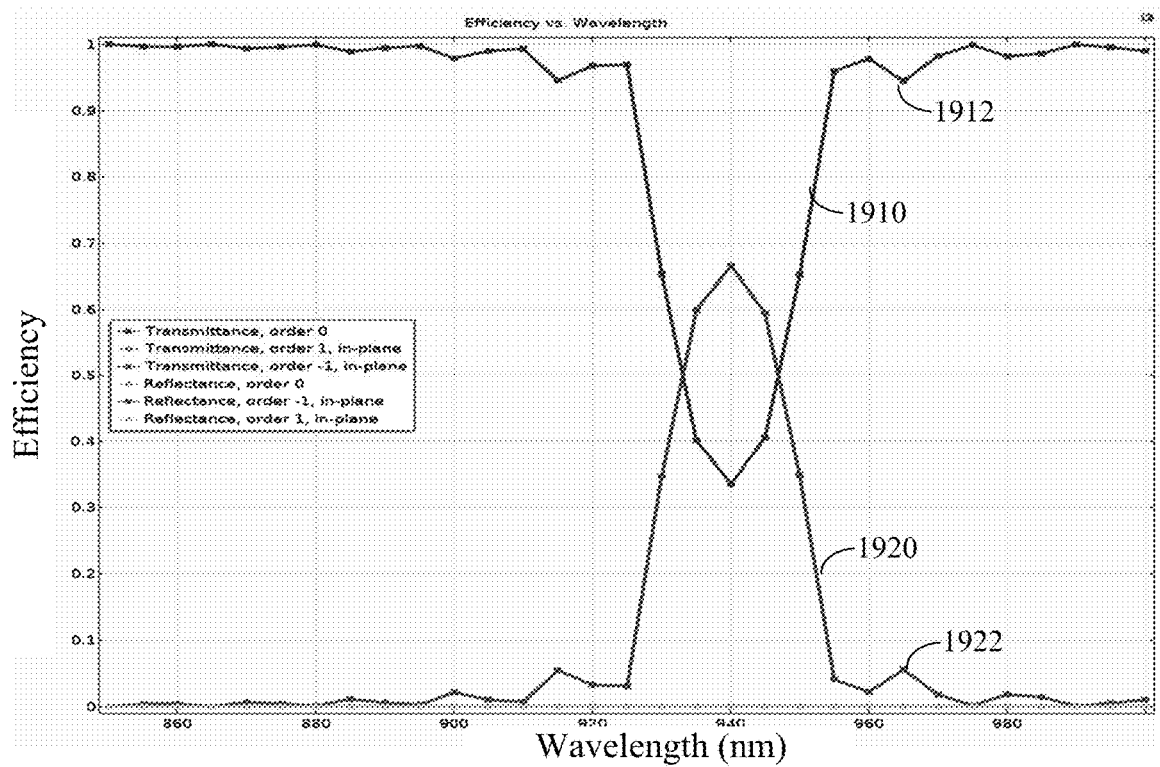
FIG. 19A illustrates the transmissivity and reflectivity of an example of a reflective holographic grating as a function of the wavelength of the incident light.

FIG. 19A is a zoom-in view of the transmissivity and reflectivity of an example of a reflective holographic grating as a function of the wavelength of the incident light. In the example, the transmissivity of the reflective holographic grating is shown by a transmissivity curve 1910 and the reflectivity of the reflective holographic grating is shown by a reflectivity curve 1920. FIG. 19A shows high sidelobes 1912 and 1922 in transmissivity curve 1910 and reflectivity curve 1920, respectively.

Figure 19B:
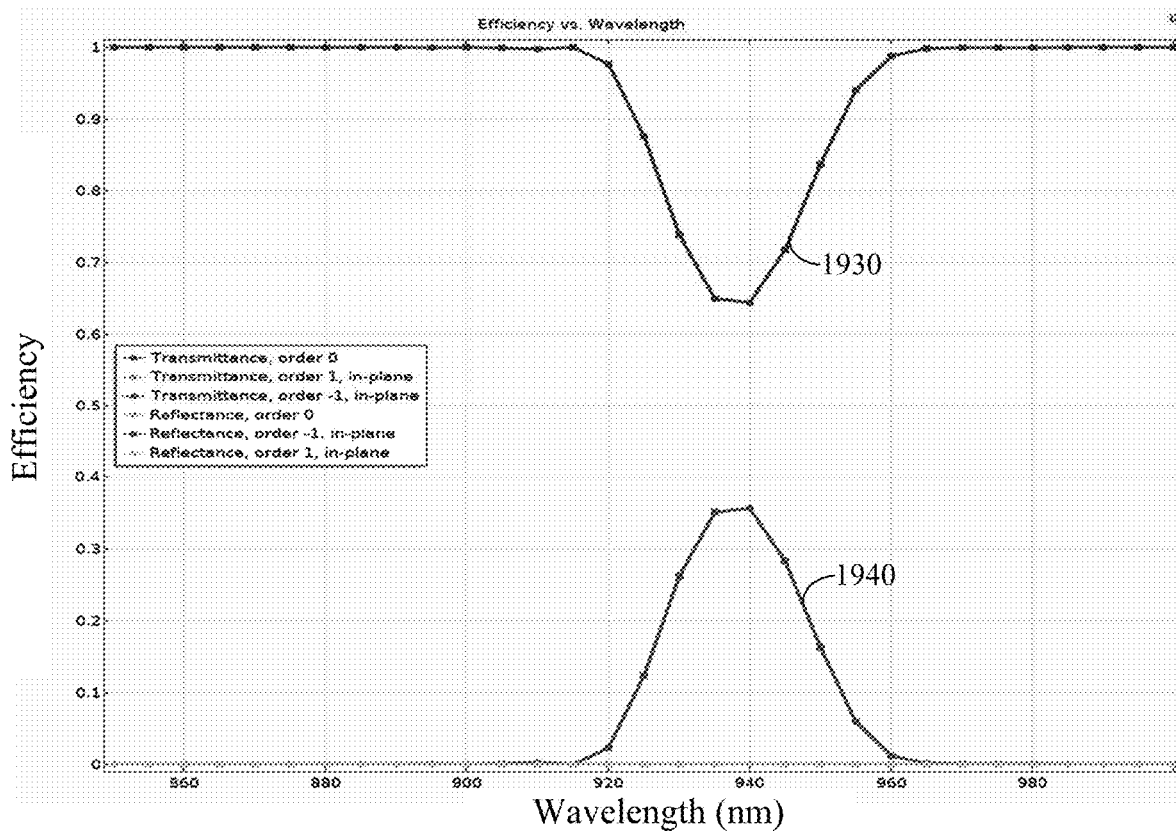
FIG. 19B illustrates the transmissivity and reflectivity as a function of the wavelength of the incident light for an example of an apodized reflective holographic grating according to certain embodiments.

FIG. 19B is a zoom-in view of the transmissivity and reflectivity of an example of an apodized reflective holographic grating as a function of the wavelength of the incident light according to certain embodiments. The apodized reflective holographic grating may be fabricated using techniques described above. The transmissivity of the reflective holographic grating is shown by a transmissivity curve 1930 and the reflectivity of the reflective holographic grating is shown by a reflectivity curve 1940. Compared with transmissivity curve 1910 and reflectivity curve 1920 shown in FIG. 19A, FIG. 19B shows no visible sidelobes in transmissivity curve 1930 and reflectivity curve 1940 or at least 10 dB suppression of the sidelobes.

Figure 20:
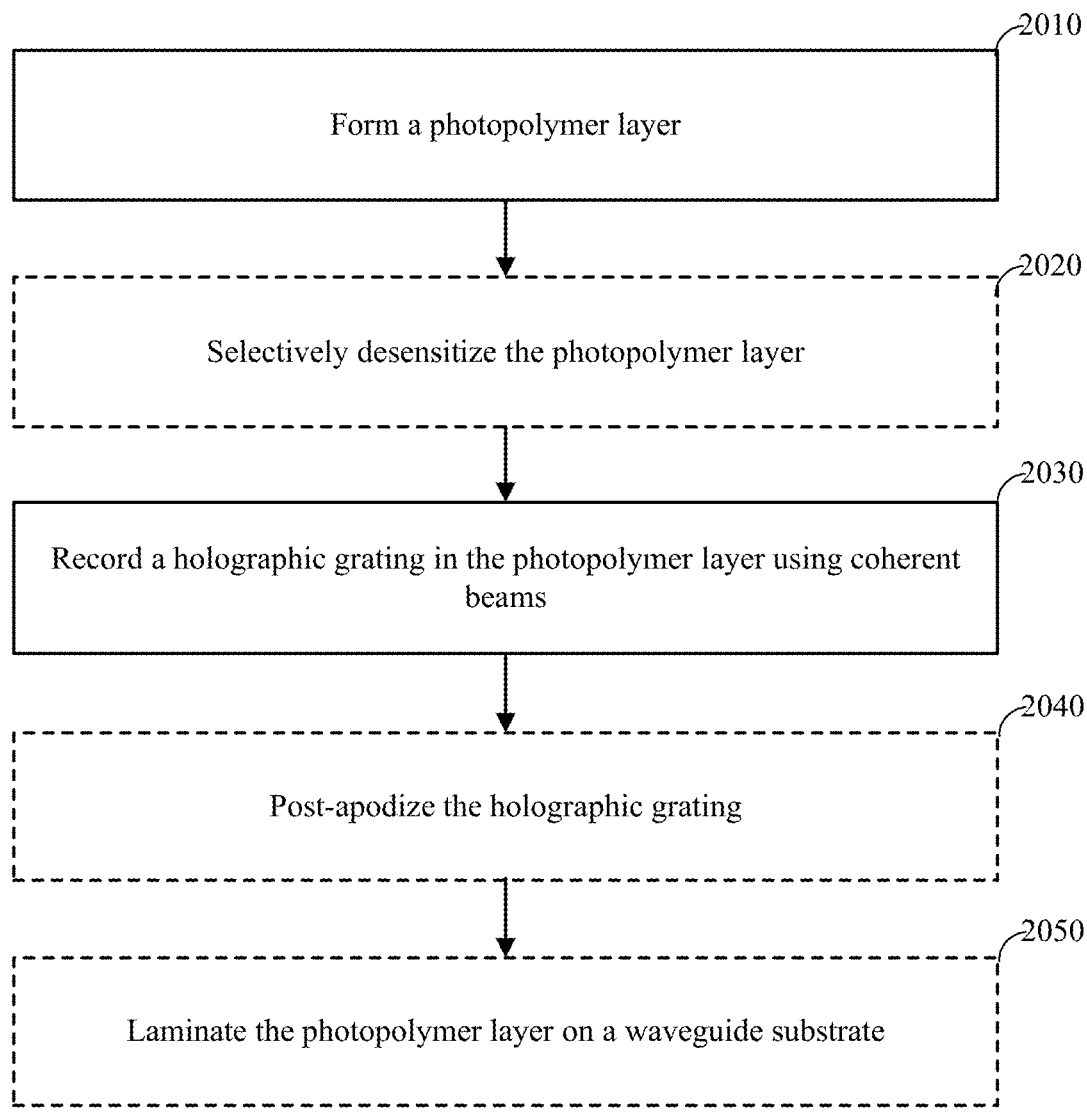
FIG. 20 is a simplified flow chart illustrating an example of a method of fabricating an apodized holographic grating for eye tracking according to certain embodiments.

FIG. 20 is a simplified flow chart 2000 illustrating an example of a method of fabricating an apodized holographic grating for eye tracking according to certain embodiments. The operations described in flow chart 2000 are for illustration purposes only and are not intended to be limiting. In various implementations, modifications may be made to flow chart 2000 to add additional operations, omit some operations, combine some operations, split some operations, or reorder some operations.

At block 2010, a photopolymer layer may be formed on a substrate, such as a glass, quartz, polymer, ceramic, crystal, semiconductor, or plastic substrate. The photopolymer layer may be sensitive to visible light or UV light and may be transparent to infrared light. In some embodiments, the photopolymer layer may be pre-made and may be conformally laminated on the substrate. For example, in some embodiments, the photopolymer layer may be sandwiched by two flexible cover layers, where a first cover layer of the two flexible cover layers may be peeled off and the photopolymer layer and the second cover layer may be laminated on the substrate using a roller. In some embodiments, the photopolymer layer may be coated or deposited on the substrate. In some embodiments, the photopolymer layer may have a thickness greater than 10 µm, 15 µm, 20 µm, 25 µm, 30 µm, 40 µm, 50 µm, or thicker. In some embodiments, the maximum achievable refractive index modulation of the photopolymer layer is at least 0.02 or at least 0.03. In some embodiments, the photopolymer layer may include multiple thin layers of photopolymer material with different compositions and different sensitivities (and thus different maximum achievable refractive index modulations). In some embodiments, the substrate may be a waveguide of a near-eye display and may be used as a combiner for the near-eye display. The substrate may have a flat or a curved surface. In some embodiments, the substrate may include a flexible substrate that acts as a cover or a support for the photopolymer layer.

Optionally, at block 2020, the photopolymer layer may be selectively desensitized using coherent or incoherent light as described above with respect to, for example, FIG. 16A. The photopolymer layer may be selectively desensitized to achieve a desired sensitivity profile (or maximum achievable refractive index modulation profile), such as a bell-shaped curve, with respect to a depth inside the photopolymer layer. In some embodiments, the photopolymer layer may be selectively desensitized using a first light beam, where a first intensity of the first light beam, a first wavelength of the first light beam, and an light absorption rate of the photopolymer layer may be configured such that the first intensity of the first light beam gradually decreases in the photopolymer layer from the first side according to a first light intensity profile to apodize or desensitize the photopolymer layer. In some embodiments, the photopolymer layer may be selectively desensitized using a first light beam from a first side of the photopolymer layer and a second light beam from a second side of the photopolymer layer. The wavelength of the first light beam, the wavelength of the second light beam, a first intensity of the first light beam, a second intensity of the second light beam, and an light absorption rate of the photopolymer layer may be configured such that the first intensity of the first light beam gradually decreases in the photopolymer layer from the first side according to a first light intensity profile, and the second intensity of the second light beam gradually decreases in the photopolymer layer from the second side according to a second light intensity profile. In some embodiments, the first light intensity profile and the second light intensity profile are symmetrical, such that the photopolymer layer may be symmetrically apodized in the thickness direction. In some embodiments, the first light intensity profile and the second light intensity profile are asymmetrical with respect to a center of the photopolymer layer in the thickness direction, such that the photopolymer layer may be asymmetrically apodized in the thickness direction. In some embodiments, the first light beam and the second light beam are coherent. In some embodiments, the first light beam and the second light beam are non-coherent. In some embodiments, the wavelength of the first light beam and the wavelength of the second light beam are identical. In some embodiments, the wavelength of the first light beam and the wavelength of the second light beam are different.

At block 2030, a holographic grating may be recorded in the photopolymer layer using two coherent beams as described above with respect to, for example, FIGS. 13A, 13B, 14A, 14B, 15A, and 16B. The holographic grating can be a transmission grating or a reflective grating. For example, to record a reflective holographic grating, two coherent recording beams may be projected on the photopolymer layer from two sides of the photopolymer layer. In some embodiments, the photopolymer layer may have been desensitized or pre-apodized as described above with respect to block 2020. In some embodiments, the intensities of the two recording beams may gradually decrease in the photopolymer layer, and thus the interference pattern of the two coherent recording beams may have a highest intensity modulation near the center of the photopolymer layer in the thickness direction to cause a highest refractive index modulation near the center of the photopolymer layer. In contrast, the interference pattern of the two coherent recording beams may have a low intensity modulation near the surfaces of the photopolymer layer, and thus the refractive index modulation near the surfaces of the photopolymer layer may be low or close to zero. In this way, a holographic grating may be apodized and recorded simultaneously in a photopolymer layer. In some embodiments, the photopolymer layer and the substrate may be sandwiched by two prism in order to achieve the desired incident angles of the recording beams on the photopolymer layer. In some embodiments where the photopolymer layer is desensitized, the two recording beams may have high intensities to form an interference pattern with substantially uniform intensity modulation in the photopolymer layer.

Optionally, in some embodiments, at block 2040, the holographic grating may be post-apodized using coherent or incoherent light. Optionally, at block 2050, the photopolymer layer may be delaminated from the substrate and laminated on a waveguide substrate.

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 21:
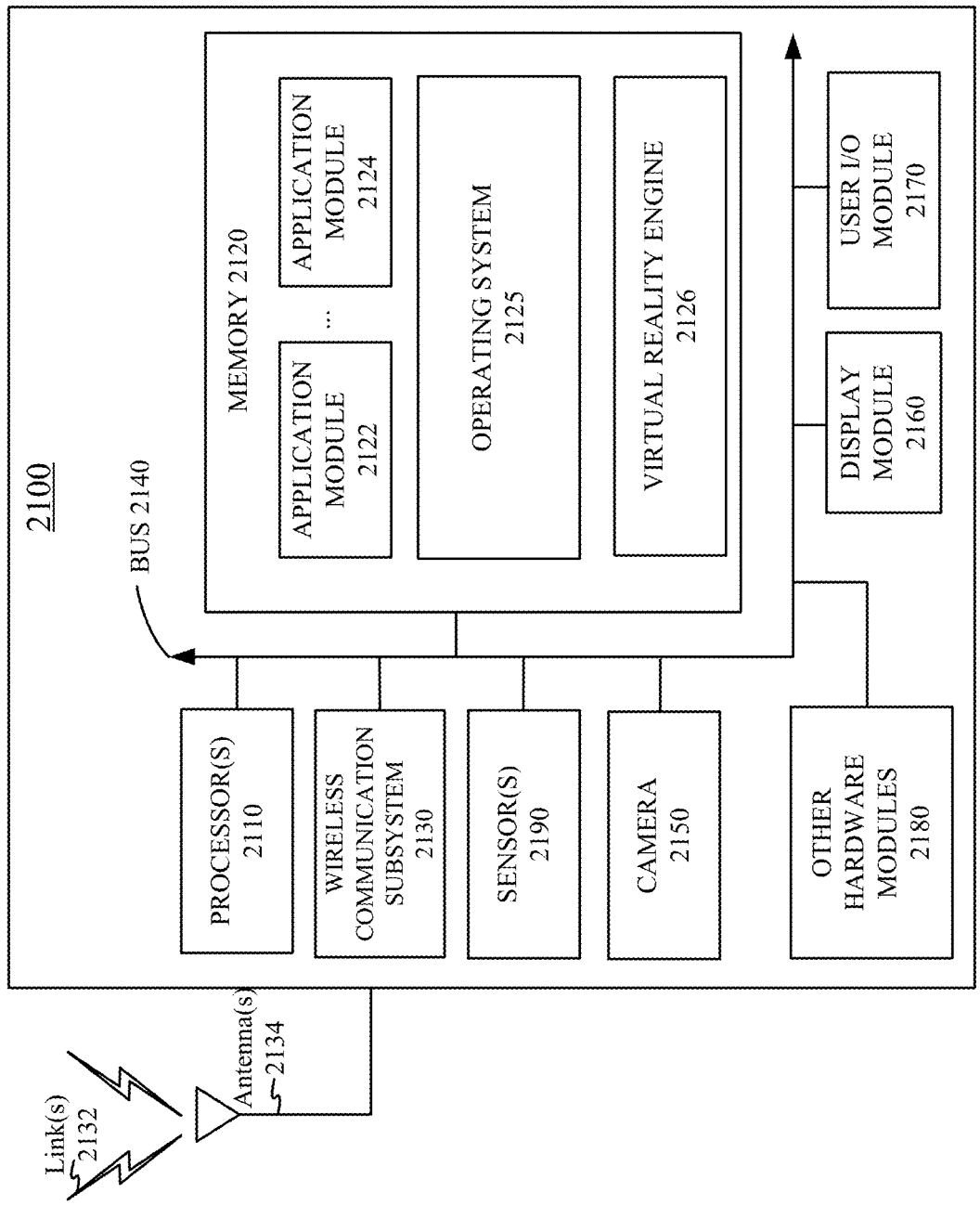
FIG. 21 is a simplified block diagram of an example of an electronic system 2100 of a near-eye display system (e.g., HMD device) for implementing some of the examples disclosed herein according to certain embodiments.

FIG. 21 is a simplified block diagram of an example of an electronic system 2100 of a near-eye display system (e.g., HMD device) for implementing some of the examples disclosed herein. Electronic system 2100 may be used as the electronic system of an HMD device or other near-eye displays described above. In this example, electronic system 2100 may include one or more processor(s) 2110 and a memory 2120. Processor(s) 2110 may be configured to execute instructions for performing operations at a number of components, and can be, for example, a general-purpose processor or microprocessor suitable for implementation within a portable electronic device. Processor(s) 2110 may be communicatively coupled with a plurality of components within electronic system 2100. To realize this communicative coupling, processor(s) 2110 may communicate with the other illustrated components across a bus 2140. Bus 2140 may be any subsystem adapted to transfer data within electronic system 2100. Bus 2140 may include a plurality of computer buses and additional circuitry to transfer data.

Memory 2120 may be coupled to processor(s) 2110. In some embodiments, memory 2120 may offer both short-term and long-term storage and may be divided into several units. Memory 2120 may be volatile, such as static random access memory (SRAM) and/or dynamic random access memory (DRAM) and/or non-volatile, such as read-only memory (ROM), flash memory, and the like. Furthermore, memory 2120 may include removable storage devices, such as secure digital (SD) cards. Memory 2120 may provide storage of computer-readable instructions, data structures, program modules, and other data for electronic system 2100. In some embodiments, memory 2120 may be distributed into different hardware modules. A set of instructions and/or code might be stored on memory 2120. The instructions might take the form of executable code that may be executable by electronic system 2100, and/or might take the form of source and/or installable code, which, upon compilation and/or installation on electronic system 2100 (e.g., using any of a variety of generally available compilers, installation programs, compression/decompression utilities, etc.), may take the form of executable code.

In some embodiments, memory 2120 may store a plurality of application modules 2122 through 2124, which may include any number of applications. Examples of applications may include gaming applications, conferencing applications, video playback applications, or other suitable applications. The applications may include a depth sensing function or eye tracking function. Application modules 2122-2124 may include particular instructions to be executed by processor(s) 2110. In some embodiments, certain applications or parts of application modules 2122-2124 may be executable by other hardware modules 2180. In certain embodiments, memory 2120 may additionally include secure memory, which may include additional security controls to prevent copying or other unauthorized access to secure information.

In some embodiments, memory 2120 may include an operating system 2125 loaded therein. Operating system 2125 may be operable to initiate the execution of the instructions provided by application modules 2122-2124 and/or manage other hardware modules 2180 as well as interfaces with a wireless communication subsystem 2130 which may include one or more wireless transceivers. Operating system 2125 may be adapted to perform other operations across the components of electronic system 2100 including threading, resource management, data storage control and other similar functionality.

Wireless communication subsystem 2130 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2100 may include one or more antennas 2134 for wireless communication as part of wireless communication subsystem 2130 or as a separate component coupled to any portion of the system. Depending on desired functionality, wireless communication subsystem 2130 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2130 may permit data to be exchanged with a network, other computer systems, and/or any other devices described herein. Wireless communication subsystem 2130 may include a means for transmitting or receiving data, such as identifiers of HMD devices, position data, a geographic map, a heat map, photos, or videos, using antenna(s) 2134 and wireless link(s) 2132. Wireless communication subsystem 2130, processor(s) 2110, and memory 2120 may together comprise at least a part of one or more of a means for performing some functions disclosed herein.

Embodiments of electronic system 2100 may also include one or more sensors 2190. Sensor(s) 2190 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2190 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2100 may include a display module 2160. Display module 2160 may be a near-eye display, and may graphically present information, such as images, videos, and various instructions, from electronic system 2100 to a user. Such information may be derived from one or more application modules 2122-2124, virtual reality engine 2126, one or more other hardware modules 2180, a combination thereof, or any other suitable means for resolving graphical content for the user (e.g., by operating system 2125). Display module 2160 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 2100 may include a user input/output module 2170. User input/output module 2170 may allow a user to send action requests to electronic system 2100. An action request may be a request to perform a particular action. For example, an action request may be to start or end an application or to perform a particular action within the application. User input/output module 2170 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2100. In some embodiments, user input/output module 2170 may provide haptic feedback to the user in accordance with instructions received from electronic system 2100. For example, the haptic feedback may be provided when an action request is received or has been performed.

Electronic system 2100 may include a camera 2150 that may be used to take photos or videos of a user, for example, for tracking the user's eye position. Camera 2150 may also be used to take photos or videos of the environment, for example, for VR, AR, or MR applications. Camera 2150 may include, for example, a complementary metal-oxide-semiconductor (CMOS) image sensor with a few millions or tens of millions of pixels. In some implementations, camera 2150 may include two or more cameras that may be used to capture 3-D images.

In some embodiments, electronic system 2100 may include a plurality of other hardware modules 2180. Each of other hardware modules 2180 may be a physical module within electronic system 2100. While each of other hardware modules 2180 may be permanently configured as a structure, some of other hardware modules 2180 may be temporarily configured to perform specific functions or temporarily activated. Examples of other hardware modules 2180 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2180 may be implemented in software.

In some embodiments, memory 2120 of electronic system 2100 may also store a virtual reality engine 2126. Virtual reality engine 2126 may execute applications within electronic system 2100 and receive position information, acceleration information, velocity information, predicted future positions, or some combination thereof of the HMD device from the various sensors. In some embodiments, the information received by virtual reality engine 2126 may be used for producing a signal (e.g., display instructions) to display module 2160. For example, if the received information indicates that the user has looked to the left, virtual reality engine 2126 may generate content for the HMD device that mirrors the user's movement in a virtual environment. Additionally, virtual reality engine 2126 may perform an action within an application in response to an action request received from user input/output module 2170 and provide feedback to the user. The provided feedback may be visual, audible, or haptic feedback. In some implementations, processor(s) 2110 may include one or more GPUs that may execute virtual reality engine 2126.

In various implementations, the above-described hardware and modules may be implemented on a single device or on multiple devices that can communicate with one another using wired or wireless connections. For example, in some implementations, some components or modules, such as GPUs, virtual reality engine 2126, and applications (e.g., tracking application), may be implemented on a console separate from the head-mounted display device. In some implementations, one console may be connected to or support more than one HMD.

In alternative configurations, different and/or additional components may be included in electronic system 2100. Similarly, functionality of one or more of the components can be distributed among the components in a manner different from the manner described above. For example, in some embodiments, electronic system 2100 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An optical device for a near-eye display, the optical device comprising:
    a substrate transparent to visible light and infrared light and configured to be placed in front of an eye of a user of the near-eye display; and
    a holographic grating conformally coupled to a surface of the substrate and configured to transmit the visible light and reflectively diffract infrared light in a first wavelength range for eye tracking, wherein the holographic grating includes a photopolymer layer on the surface of the substrate, and wherein a refractive index modulation of the holographic grating is apodized in a direction along a thickness of the photopolymer layer to reduce optical artifacts in the visible light.

2. The optical device of claim 1, wherein a magnitude of the refractive index modulation of the holographic grating in the direction along the thickness of the photopolymer layer is characterized by a bell-shaped curve.

3. The optical device of claim 1, wherein a magnitude of the refractive index modulation of the holographic grating is asymmetrical in the direction along the thickness of the photopolymer layer.

4. The optical device of claim 1, wherein the holographic grating includes a reflective holographic grating configured to transmit the visible light and reflectively diffract the infrared light in the first wavelength range for eye tracking.

5. The optical device of claim 4, wherein the holographic grating is configured to reflectively diffract the infrared light in the first wavelength range from an infrared light source to the eye of the user or from the eye of the user to an infrared camera.

6. The optical device of claim 1, wherein:
    the substrate is configured to guide display light within the substrate through total internal reflection; and
    the holographic grating includes a grating coupler configured to couple at least a portion of the display light out of the substrate.

7. The optical device of claim 1, wherein:
    the thickness of the photopolymer layer is greater than 15 µm; and
    a maximum refractive index modulation of the holographic grating is at least 0.035.

8. A method of fabricating an optical device for a near-eye display, the method comprising:
    obtaining a photopolymer layer on a support substrate, wherein the photopolymer layer is sensitive to light in a first wavelength range; and
    projecting, from a first side of the photopolymer layer, a first light beam in the first wavelength range on the photopolymer layer,
    wherein a first wavelength of the first light beam, a first intensity of the first light beam, and a light absorption rate of the photopolymer layer are configured such that the first intensity of the first light beam gradually decreases in the photopolymer layer in a direction along a thickness of the photopolymer layer from the first side according to a predetermined light intensity profile to apodize the photopolymer layer in the direction along the thickness of the photopolymer layer.

9. The method of claim 8, wherein projecting the first light beam on the photopolymer layer comprises:
positioning a prism adjacent to the photopolymer layer, wherein a refractive index of the prism is greater than 1.33; and
projecting the first light beam on the prism,
wherein the prism refracts the first light beam on the photopolymer layer.

10. The method of claim 8, further comprising recording a holographic grating in the apodized photopolymer layer, wherein:
the holographic grating is apodized in the direction along the thickness of the photopolymer layer; and
the holographic grating is configured to transmit light in the first wavelength range and reflectively diffract infrared light for eye tracking.

11. The method of claim 8, further comprising projecting, from a second side of the photopolymer layer, a second light beam in the first wavelength range on the photopolymer layer, wherein:
a second wavelength of the second light beam, a second intensity of the second light beam, and the light absorption rate of the photopolymer layer are configured such that the second intensity of the second light beam gradually decreases in the photopolymer layer in the direction along the thickness of the photopolymer layer from the second side to apodize the photopolymer layer in the direction along the thickness of the photopolymer layer.

12. The method of claim 11, wherein the first wavelength and the second wavelength are identical or are different.

13. The method of claim 11, wherein the photopolymer layer is asymmetrically apodized in the direction along the thickness of the photopolymer layer.

14. The method of claim 11, wherein:
the first light beam and the second light beam are coherent; and
the first light beam and the second light beam interfere in the photopolymer layer to form an apodized holographic grating in the photopolymer layer.

15. The method of claim 14, wherein a magnitude of a refractive index modulation of the apodized holographic grating in the direction along the thickness of the photopolymer layer is characterized by a bell-shaped curve.

16. The method of claim 14, wherein the apodized holographic grating is configured to perform at least one of:
reflectively diffracting infrared light for eye tracking; or
reducing optical artifacts in visible light.

17. The method of claim 11, further comprising:
recording a holographic grating in the apodized photopolymer layer; or
desensitizing the photopolymer layer such that the photopolymer layer is not photosensitive to light in the first wavelength range.

18. The method of claim 8, wherein the photopolymer layer includes:
a photosensitive material configured to absorb the first light beam to initiate polymerization in the photopolymer layer; and
a light absorption material configured to absorb the first light beam without initiating the polymerization in the photopolymer layer.

19. The method of claim 8, wherein the photopolymer layer includes a plurality of layers of different photopolymer materials that have different maximum achievable amplitudes of refractive index modulation.

* * * * *